(12) United States Patent
Crommett

(10) Patent No.: US 11,672,239 B2
(45) Date of Patent: Jun. 13, 2023

(54) AUTOMATED AND ACCURATE FISHING TACKLE CASTING DEVICE AND METHODS OF USE

(71) Applicant: Joe Crommett, Kirby, AR (US)

(72) Inventor: Joe Crommett, Kirby, AR (US)

( * ) Notice: Subject to any disclaimer, the term of this patent is extended or adjusted under 35 U.S.C. 154(b) by 183 days.

(21) Appl. No.: 16/929,046

(22) Filed: Jul. 14, 2020

(65) Prior Publication Data

US 2022/0015345 A1 Jan. 20, 2022

(51) Int. Cl.
*A01K 91/02* (2006.01)
*A01K 91/03* (2006.01)

(52) U.S. Cl.
CPC ............ *A01K 91/02* (2013.01); *A01K 91/03* (2013.01)

(58) Field of Classification Search
CPC ...... A01K 91/02; A01K 91/03; A01K 87/007; A01K 97/00; E05B 73/007; Y10T 292/096
See application file for complete search history.

(56) References Cited

U.S. PATENT DOCUMENTS

| | | | |
|---|---|---|---|
| 1,376,260 A * | 4/1921 | Davis | A01K 91/02 43/19 |
| 2,065,153 A * | 12/1936 | Proudfit | A01K 91/02 43/25 |
| 2,552,516 A | 5/1951 | Camp et al. | |
| 2,709,315 A * | 5/1955 | Walter | A01K 91/02 43/25 |
| 2,765,568 A | 10/1956 | Kozar | |
| 2,817,178 A * | 12/1957 | Keck | A01K 91/02 43/19 |
| 3,001,316 A * | 9/1961 | Fefelov | A01K 91/02 43/19 |
| 3,142,127 A | 7/1964 | Mason | |
| 3,943,650 A | 3/1976 | Johansson et al. | |
| 4,127,956 A | 12/1978 | Hertkorn | |
| 4,439,944 A | 4/1984 | Johnson | |
| 4,845,880 A * | 7/1989 | Miller | A01K 91/02 43/19 |

(Continued)

FOREIGN PATENT DOCUMENTS

| | | | | |
|---|---|---|---|---|
| CA | 2943092 A1 * | 3/2017 | | A01K 87/007 |
| RU | 2020816 C1 * | 10/1994 | | A01K 91/02 |

(Continued)

*Primary Examiner* — Peter M Poon
*Assistant Examiner* — Carly W. Lynch
(74) *Attorney, Agent, or Firm* — Hulsey P.C.

(57) ABSTRACT

Fishing tackle casting device mounts to fishing rod for casting fishing lure including housing having a groove, and a trigger mechanism including a U-shaped rod. The fishing tackle casting device mounts to the handle or fishing pole of the fishing rod. The fishing rod includes a line reel having line drawn from a line reel along the fishing pole. Line includes a fishing lure that locks to U-shaped rod through a groove causing the fishing pole to bend and store energy. The fishing pole may direct toward targeted area and the trigger mechanism actuation releases the fishing lure from U-shaped rod through the groove causing tension release of bent fishing pole, making fishing lure and line travel to targeted area. The trigger mechanism includes trigger support mechanism for connecting line from the line reel and helps control speed/release of tension on the line when the fishing lure is cast.

15 Claims, 19 Drawing Sheets

(56) References Cited

U.S. PATENT DOCUMENTS

| | | | |
|---|---|---|---|
| 5,210,972 A | | 5/1993 | Collins |
| 5,361,611 A | * | 11/1994 | Hisler ............... A01K 97/00 |
| | | | 224/406 |
| 5,495,688 A | | 3/1996 | Sondej et al. |
| 5,620,149 A | | 4/1997 | Zurcher et al. |
| 7,698,851 B1 | | 4/2010 | Donohoe |
| 2003/0014898 A1 | | 1/2003 | Benit et al. |
| 2005/0166443 A1 | * | 8/2005 | Shen ............... A01K 91/02 |
| | | | 43/26.1 |
| 2006/0162230 A1 | * | 7/2006 | Moss ............... A01K 91/20 |
| | | | 43/19 |
| 2006/0288628 A1 | | 12/2006 | Polzin |
| 2010/0186281 A1 | | 7/2010 | Dungan |
| 2011/0005120 A1 | | 1/2011 | de Koning et al. |
| 2012/0011761 A1 | | 1/2012 | Al-Mutairi |
| 2012/0067992 A1 | | 3/2012 | Brucker |
| 2015/0096219 A1 | | 4/2015 | Muntz |
| 2017/0086437 A1 | * | 3/2017 | Essafi ............... A01K 91/02 |

FOREIGN PATENT DOCUMENTS

| | | | | |
|---|---|---|---|---|
| WO | WO-2007040486 A2 | * | 4/2007 | ............ A01K 91/02 |
| WO | WO-2018151502 A1 | * | 8/2018 | ............ A01K 91/02 |

* cited by examiner

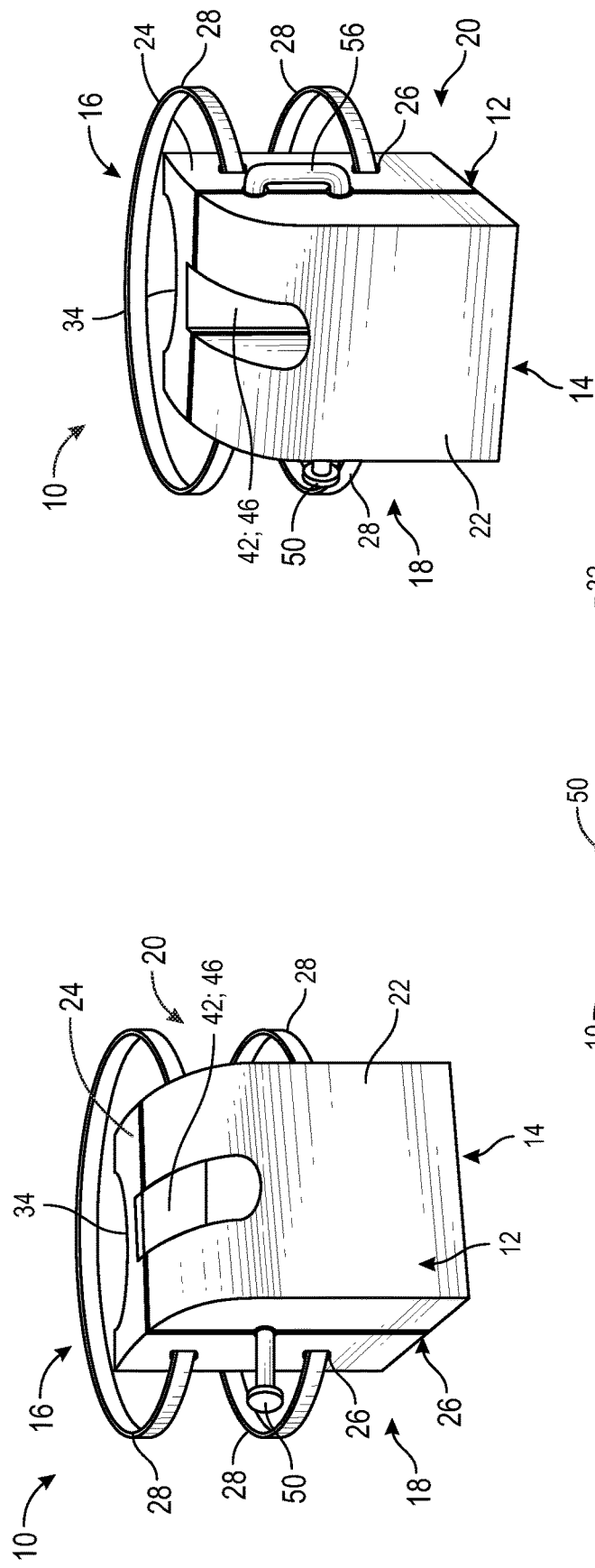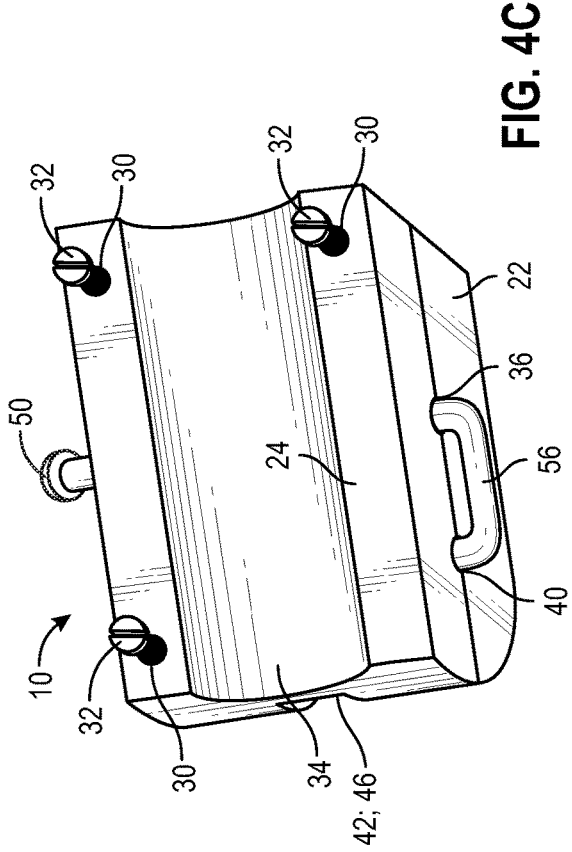
FIG. 4B
FIG. 4C
FIG. 4A

AUTOMATED AND ACCURATE FISHING TACKLE CASTING DEVICE AND METHODS OF USE

FIELD OF THE DISCLOSURE

The present invention generally relates to fishing equipment. More specifically, the present disclosure describes and claims an automated and accurate fishing tackle casting device and methods of use. Yet more specifically, the present invention relates to fishing tackle casting device or fishing line casting device that allows to throw fishing lure, sinker, fish hook, or other article of fishing tackle into small, restricted, or hard to reach areas that fisherman can't normally access without strain or movement of the fisherman's arms, shoulders, or upper body.

BACKGROUND OF THE DISCLOSURE

It is known that different types of equipment such as rods, reels, line, and lures, and other fishing techniques are used during different fishing situations. Some of the features are common to most situations in spite of using different fishing techniques. Irrespective of the fishing technique used, effectively casting fishing lure, fastened bait, hook, or other similar articles into a desired location on the water is the most fundamental of all fishing techniques.

The practice of casting fishing lure/hook into a small area or between hanging branches requires great skill and lots of practice. Also, fishermen are often limited because lack of space or trees or limbs prevent them from swinging poles to the left or right or overhead to cast fishing lure. In order to aid the fishermen in casting fishing lure, casting devices have been used in the past. However, existing casting devices (fishing poles) do not give fisherman the ability to access small areas such as between floats of a boat dock or under the limbs of a tree, both of which may be a distance away from them. Current methods of casting also require the pole to be moved to the side or overhead, which can cause safety concerns. Also, fisherman with injuries or disabilities often cannot effectively cast fishing lure using current methods and devices.

A recent popular development in fishing is "dock shooting." In this, a fisherman tries to cast his/her lure in a small opening around or under a dock where fish may be hiding. "Dock shooting" requires advanced casting skills and is awkward. The fisherman must hold the lure in one hand, the fishing line in the other hand, bend the pole, and aim toward the desired area. He/she must often then literally get on their hands and knees to reach the level of the dock, lean over the side of the boat, and simultaneously release both hands at once while aiming the pole toward the desired area. Most fisherman do not have the skill to accomplish this.

Several attempts have been made in the past to address the issues related to launching or casting fishing lure. Some of the methods used include slingshot method, catapults, and air rifles. One such example is disclosed in a United States patent application No. 2012/0067992, entitled "Casting Post" (the "'992 Publication"). The '992 Publication discloses that the invention provides a means to utilize the spring capability of the rod to launch a fishing lure. This device provides an area on the bail of the reel, the Casting Post, to locate the lure on the closed bail when bending the rod into a position to launch the lure. The lure is launched by releasing the bail to the open position.

The '992 patent, therefore, provides a post or pin that is attach to the fishing reel. The reel is wound or pulled inward to create tension on the pole. The line is then placed over the pole locking the line in place and locking the pole tension in. Thus, this device attaches to the reel. The lure and line are released by manually opening the reel bail, which requires two hands and could limit the accuracy of the cast. The caster simply points the rod toward the desired area and pushes a button, which releases and sends the lure to the desired area. It requires only one hand to complete. A significant drawback is that this design must be manufactured with the reel and cannot be added to any type of fishing pole.

Another example is disclosed in a United States patent application No. 2003/0014898, entitled "Manual/Automatic Casting Mechanism" (the "'898 Publication"). The '898 Publication discloses a rod and reel combination which may be configured for normal casting or for automatic casting. For automatic casting the rod is flexed by turning the reel crank and the cast is made by pressing the thumb button to free the line as the kinetic energy stored in the flexed rod is imparted to the weight.

The invention of the '898 Publication requires a specially designed rod and reel combination built to work together properly. The rod has only one eyelet compared to several on a conventional rod. Thus '898 Publication's apparatus cannot be used with a conventional rod which includes multiple eyelets, because multiple eyelets would prevent the pole from being bent to store energy. A problem with having but one eyelet, however, includes a bow and arrow effect. With the bow and arrow effect, the line becomes spread far from the pole. This makes the line susceptible to being caught on objects, such as limbs, as well as making the pole operation difficult when reeling in a fish. The apparatus of the '898 Publication, also, is not able to cast conventional fishing lures. This is because conventional fishing lures will likely get tangled with the line and fishing pole eyelet when in the locked position or when being cast.

With the apparatus of the '898 Publication, also, the rod is bent upward, which makes it unsuitable to accomplish the desired goal of dock casting or casting under tree limbs. This is because the necessary casting trajectory with that device would throw the lure into the dock or limb instead of under it. Because of this limitation, it is generally not possible to project the lure under the dock/limb instead of into it.

Yet another example is disclosed in a United States patent application No. 2011/0005120, entitled "Bow Fishing Rod" (the "'120 Publication"). The '120 Publication discloses that the present application is directed to a fishing device including a body, a reel, an article of fishing tackle, fishing line attached to the reel and to the article of fishing tackle, and a spring-powered launch mechanism. The launch mechanism includes a slidable member, in slidable relation with the body and adapted to releasably receive the article of fishing tackle, and at least one extension member which can be extended and subsequently released to impart a motive force on the slidable member and propel the article of fishing tackle from the fishing device.

With the '120 Publication, fishing tackle propulsion is created by a spring located in the base of the fishing rod. The lure in is kept in a depository on the distal end of the pole. There, the trigger is on the reel and simultaneously releases the spring on the reel, because the apparatus is contained in and is part of the rod and reel. In operation, the entire rod spine is pulled backward through the base locking a spring in place. After the trigger is pushed, and forward movement of the rod spine provides propulsion for the fishing lure. All in all, the device of the '120 Publication is a generally more complicated and less reliable configuration than is desirable.

Yet another example is disclosed in a United States patent application No. 2012/0011761 entitled "Fishing Rod with A Casting Mechanism" ("the '761 Publication"). The '761 Publication discloses a fishing rod with automatic casting mechanism includes an elongated fishing rod, a reel and a length of fishing line stored on the reel with one end of the line fixed to the reel and a plurality of line guides along the rod with a single line guide at the distal end thereof. The fishing line extends from the reel and through the line guides including the final line guide at the end of the rod. A weighted fishing lure is attached to an opposite end of the fishing line and includes the hook. A push button releases the energy in the coil spring and includes a gravity operated L-shaped element for blocking the movement of the button when the tip of the rod is disposed at an angle of less than 45°. This allows the button to be pushed when the rod is disposed at angles from about 45° up to almost 90° to thereby automatically propel the lure and line across the water.

Yet again, the device of the '761 Publication is a specially constructed pole in the form of a sizeable tube that is part of rod. There, a string is pulled backward to put tension on or load on a spring to lock the device in place. Releasing the device pushes the lure toward the target. The casting tube, accordingly, contains a spring that is pulled back or compressed to provide power for the cast. Only a certain sized lead ball can be placed in the tube. The ball is connected to a hook and line on the fishing reel. When the trigger is pulled, the spring is released and the weight is pushed in an arc toward the target. The hook and fishing line are also pulled to the target. This device cannot easily cast many different types of fishing tackle. Moreover, the device of the '761 Publication includes a safety feature that prevents the load spring from being released when the rod angle is not pointed up at least a 45 degree angle. This necessarily complicates operations and limits the utility of the '761 Publication's device.

Although the above-discussed disclosures help to launch or cast fishing lure or other projectile using different launching mechanisms, they have the identified and clearly demonstrated problems and limitations. Therefore, there is a need for fishing tackle casting device that uses the power stored in the bent fishing pole, and a trigger system to send the lure straight to the desired location.

BRIEF SUMMARY OF THE DISCLOSURE

It is an object of the present invention to provide a fishing tackle casting device that may connect to a fishing rod for casting fishing lure, and avoids the drawback of known techniques.

It is another object of the present invention to provide fishing tackle casting device that allows a fisherman with no knowledge of casting fishing lure or with physical limitations or injuries to cast accurately without strain.

It is another object of the present invention to provide fishing tackle casting device that allows propelling the fishing lure on a straight line forward to the desired area, making it possible for the fishing lure to enter small or seclude area otherwise not available to fishermen.

It is another object of the present invention to provide fishing tackle casting device that uses the power stored in the bent fishing pole, a trigger system, and the timing and dexterity of the fisherman's or user's finger or a release device to send the fishing lure straight to the desired location.

It is yet another object of the present invention to provide fishing tackle casting device that does not require motion or movement of the fisherman's arms, shoulders, or upper body making it useable by fishermen with injuries or disabilities.

In order to achieve to overcome the limitations here stated, the present invention provides fishing tackle casting device that is removably mounted to fishing rod either at handle or fishing pole of fishing rod. As known, fishing rod includes line reel. Line reel includes line drawn from line reel, provided along the length of fishing pole. Line includes fishing lure at its free end.

In one embodiment, fishing tackle casting device includes housing. Housing includes first part and second part. At the inner side, first part includes first receiving section, first spring receiving section, second receiving section, and first groove. Further, inner side of second part includes second spring receiving section and second groove. Further, first part includes trigger mechanism. Trigger mechanism includes U-shaped rod having first section, second section and third section. First section is placed in first receiving section. Third section is placed in second receiving section. Further, trigger mechanism includes spring mounted at first section of U-shaped rod and placed between first spring receiving section and second spring receiving section.

In one technical feature of the invention, fishing lure is secured to third section of U-shaped rod through first groove and second groove. Fishing lure is secured or locked to U-shaped rod causing fishing pole to bend and store energy. Fishing pole is directed towards targeted area and trigger mechanism is actuated or pressed to release fishing lure from U-shaped rod to make fishing lure and line travel to the targeted area. Here, it should be understood that fishing tackle casting device locks fishing lure and uses the power stored in the bent fishing pole to cast the fishing lure when fishing lure is released upon actuating the trigger mechanism. As the bent fishing pole is released, the tension on the fishing pole is released which carries away the fishing lure and line to desired area similar to power of "rod throw" with accompanying arm motion to the side or overhead to cast the fishing lure.

In another embodiment, housing includes trigger support mechanism. Trigger support mechanism is mounted to trigger mechanism. Trigger support mechanism includes extended member mounted to first section of U-shaped rod. Extended member includes rod drawn through a groove at side of housing. Rod includes head portion and neck portion. Neck portion is tapered or rounded at desired angle. Line from line reel is mounted at neck portion. A trigger support mechanism helps to control speed and release of tension on line when fishing lure is casted. Further, line mounted at neck portion allows to adjust the position of line inwardly or outwardly to synchronize the release of lure or hook to maximize the distance of the cast.

In one advantageous feature of the present invention, fishing tackle casting device helps to lock fishing lure and fishing line securely into place until the fisherman pushes or actuates trigger mechanism or button to release the line and fishing lure straight to the desired area without swinging the fishing rod to the side or overhead. Fishing tackle casting device may be mounted at right or left side of handle or fishing pole depending upon whether fisherman is right or left handed. Fishing tackle casting device may be operated using one hand to "dock Shoot" instead of the existing two-handed method, and does not require the fisherman to lower themselves to the level of the dock. Fishing tackle casting device further propels the fishing lure on a straight line forward to the desired area which makes it extremely accurate, making it possible for the fishing lure to enter small or seclude area otherwise not available to fishermen. Fishing tackle casting device does not require motion or movement of the fisherman's arms, shoulders, or upper body making it useable by fishermen with injuries or disabilities.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIGS. 4A, 4B and 4C illustrate a front perspective, a side perspective and a bottom perspective view, respectively of fishing tackle casting device, respectively, in accordance with one embodiment of present invention;

DETAILED DESCRIPTION OF THE EMBODIMENTS

The detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed fishing tackle casting device. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed fishing tackle casting device.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of fishing tackle casting device, it is to be further understood that numerous changes may arise in the details of the embodiments of the fishing tackle casting device. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Figure 1:
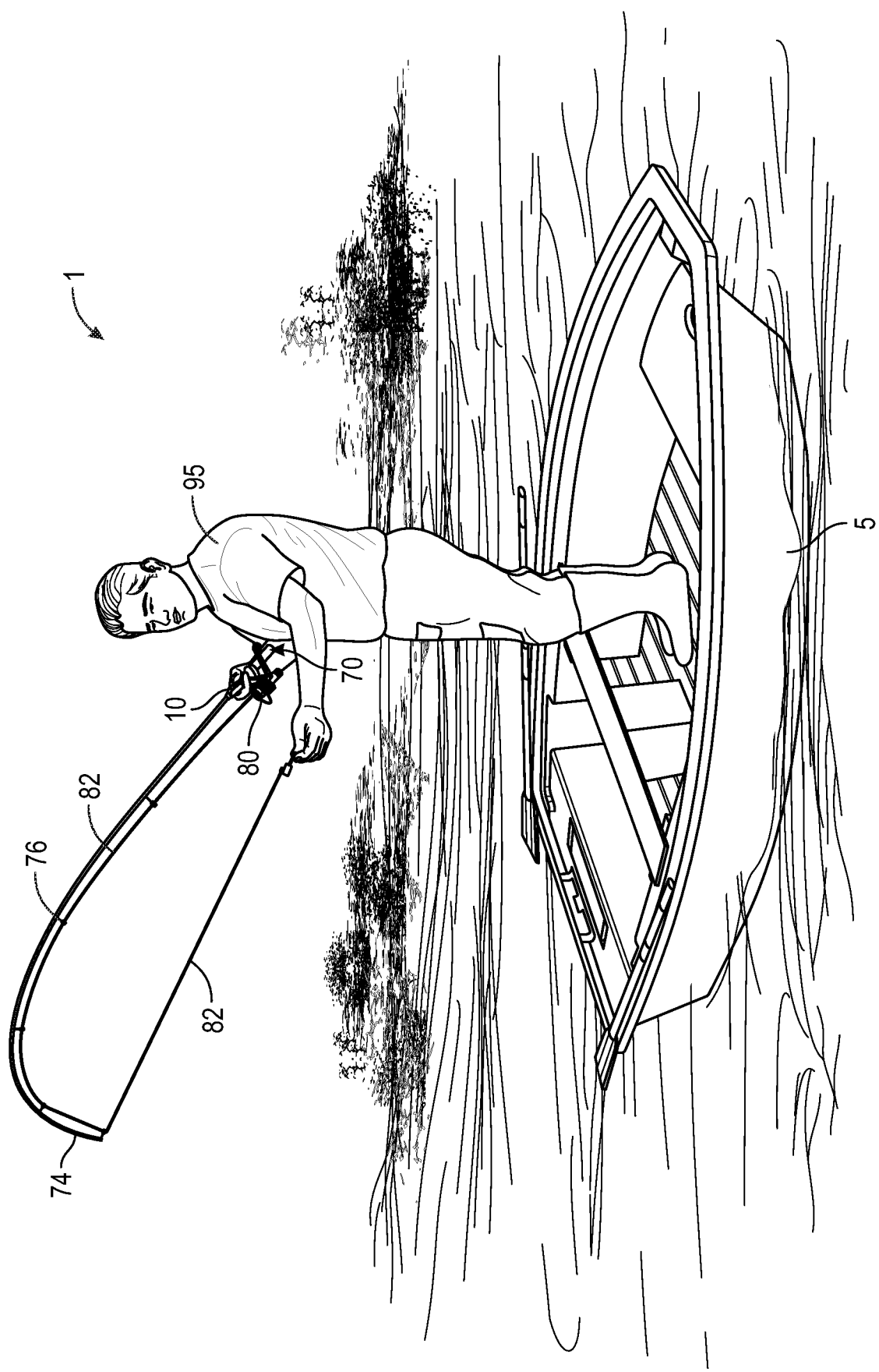
FIG. 1 illustrates an environment in which a user mounts a fishing tackle casting device to a fishing rod for casting fishing lure.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be understood that the present invention describes a fishing tackle casting device mounted to fishing rod for casting fishing lure. Fishing tackle casting device includes housing having trigger mechanism. Trigger mechanism includes U-shaped rod. Further, housing includes groove. Fishing tackle casting device is mounted to handle or fishing pole of fishing rod. Fishing rod including line reel having line drawn from line reel and drawn along fishing pole. Line includes fishing lure. Fishing lure is locked to U-shaped rod of fishing tackle casting device through groove causing fishing pole to bend and store energy. Fishing pole is directed towards targeted area and trigger mechanism is actuated to release fishing lure from U-shaped rod through groove such that tension caused at fishing pole is released to make fishing lure and line travel to the targeted area. In one embodiment, trigger mechanism includes trigger support mechanism for connecting line from line reel. Trigger support mechanism helps to control speed and release of tension on line when fishing lure is casted.

Various features and embodiments of fishing tackle casting device mounted to fishing rod for casting fishing lure are explained in conjunction with the description of FIGS. 1-19.

In one embodiment, the present invention discloses fishing tackle casting device 10 for casting fishing lure accurately without strain, skill and experience. FIG. 1 shows environment 1 in which fishing tackle casting device 10 may use in conjunction with fishing rod 70 for casting fishing lure 84 accurately without strain, skill and experience. User 95 may stand or sit on boat 5 holding fishing rod 70 for casting fishing lure 84. As known, fishing rod 70 may include handle 72, as can be seen in FIG. 1. Further, referring to FIGS. 2, 3, 7 and 8, fishing rod 70 may include fishing pole 74 extending from handle 72. Fishing pole 74 may include eyes or rings 76 provided at equal or varying distance from one another along the length of fishing pole 74. Fishing rod 70 may include line reel 80 mounted to handle 72 or fishing pole 74 as known in the art. Line reel 80 may include line 82. Line 82 may be drawn from line reel 80 and extended through eyes 76. In the current embodiment, line 82 may be provided with fishing lure 84 at the free end, as shown in FIG. 8. Fishing lure 84 may include sinker, fish hook, or any other article fishing tackle. In accordance with one exemplary embodiment, fishing lure 84 may include head 86. Head 86 may include line receiving area 88 indicating a ring-like structure for receiving or connecting line 82 to fishing lure 84. Fishing lure 84 may further include hook 90 extending from head 86.

As specified above, fishing tackle casting device 10 may be used in conjunction with fishing rod 70 for casting fishing lure 84 accurately without strain, skill and experience. Now referring to FIGS. 4A and 4B show a front perspective view and a side perspective view, respectively of fishing tackle casting device 10, in accordance with one embodiment of the present invention. Fishing tackle casting device 10 may include housing 12. Housing 12 may be made up a variety of materials. For example, housing 12 may be made of metal, plastic, wooden, or any other similar material. Housing 12 may be made in variety of shapes. For example, housing 12 may be made in square, rectangular or any other shape. Housing 12 includes front end 14, rear end 16, first side 18 and second side 20. First side 18 may indicate right side of housing 12, and second side 20 may indicate left side of housing 12, or vice versa.

Housing 12 may include first part 22 and second part 24. As can be seen from FIGS. 4A and 4B, first part 22 may be provided at front end 14, and second part 24 may be provided at rear end 16 of housing 12. Second part 24 may include first holes 26 provided at first side 18 and second side 20. First holes 26 may be provided through the entire width of second part 24 or may be formed at corners or edges to connect second part 24 to other components such as fishing rod. In the current embodiment, first holes 26 may be used for receiving connectors 28. Connectors 28 may include straps or loops or any other mechanism made up of variety of materials used for connecting second part 24 to other components such as fishing rod.

Further, first part 22 and second part 24 may include corner holes 30 provided through their thickness entirely or partially for receiving fasteners 32 to couple first part 22 and second part 24. Referring to FIG. 4C, a bottom perspective view of housing 12 is shown. As can be seen, housing 12 i.e., second part 24 may include pole receiving section 34 indicating a semi-cylindrical portion across the length of second part 24 for accommodating pole 74 (explained in the later part of the description) at rear end 16. As can be seen, pole receiving section 34 may indicate a semi-cylindrical cut-section at rear end 16 for receiving pole 74 when fishing tackle casting device 10 may be mounted to fishing rod 70.

Figure 5:
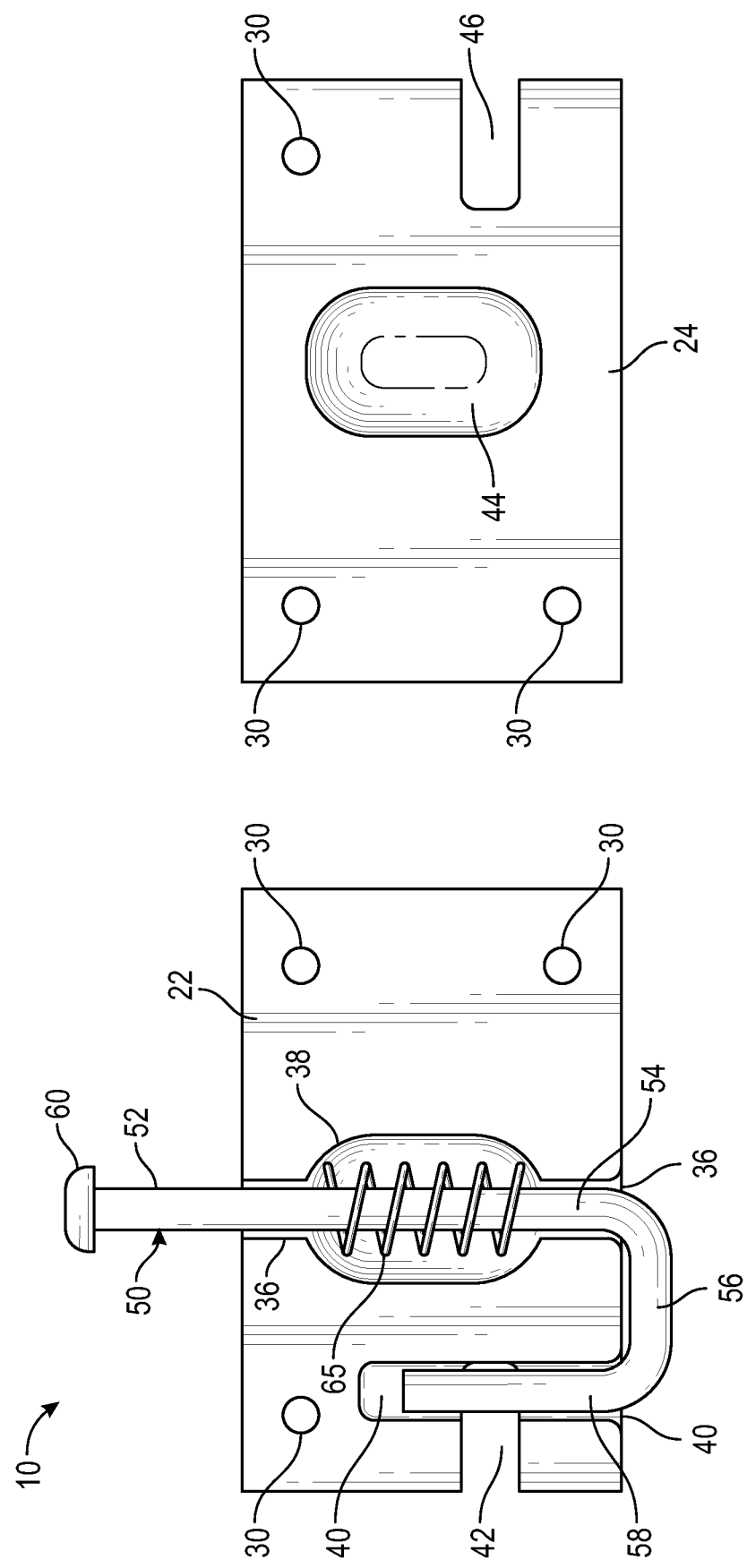
FIG. 5 illustrates a top view of inner side of first and second part of the fishing tackle casting device in flip opened position.

Now referring to FIG. 5, flip opened position of first part 22 and second part 24 showing respective inner sides is shown, in accordance with one embodiment of the present invention. At the inner side, first part 22 may include first receiving section 36. First receiving section 36 may indicate an elongated cut-section in semi-cylindrical shape provided across the width of first part 22. Further, first part 22 may include first spring receiving section 38. First spring receiving section 38 may indicate semi-cylindrical cut-section provided at the center of inner side of first part 22. As can be seen, first spring receiving section 38 may include a portion of first receiving section 36. Further, first part 22 may include second receiving section 40. Second receiving section 40 may be provided parallel to first receiving section 36 in that second receiving section 40 may be provided at half the length of first receiving section 36. Alternatively, second receiving section 40 may indicate an elongated cut-section in semi-cylindrical shape provided at approximately half the width of first part 22. Further, first part 22 may include first groove 42 provided at one side through second receiving section 40 for providing access to second receiving section 40 from outside of first part 22.

Further, second part 24 may include second spring receiving section 44 provided as semi-cylindrical cut-section at center of inner side of second part 24. It should be understood that second spring receiving section 44 may have a similar shape and size to that of first spring receiving section 38, such that when second part 24 aligns and mounts to first part 22, they may form a complete cylindrical cut-section at the center of housing 12 (i.e., first part 22 and second part 24). Further, second part 24 may include second groove 46. Similar to first groove 42 at first part 22, second groove 46 may be provided at one side of second part 24. When second part 24 aligns with and mounts to first part 22, second groove 46 together with first groove 42 may provide access to second receiving section 40 from outside of housing 12.

Figure 6:
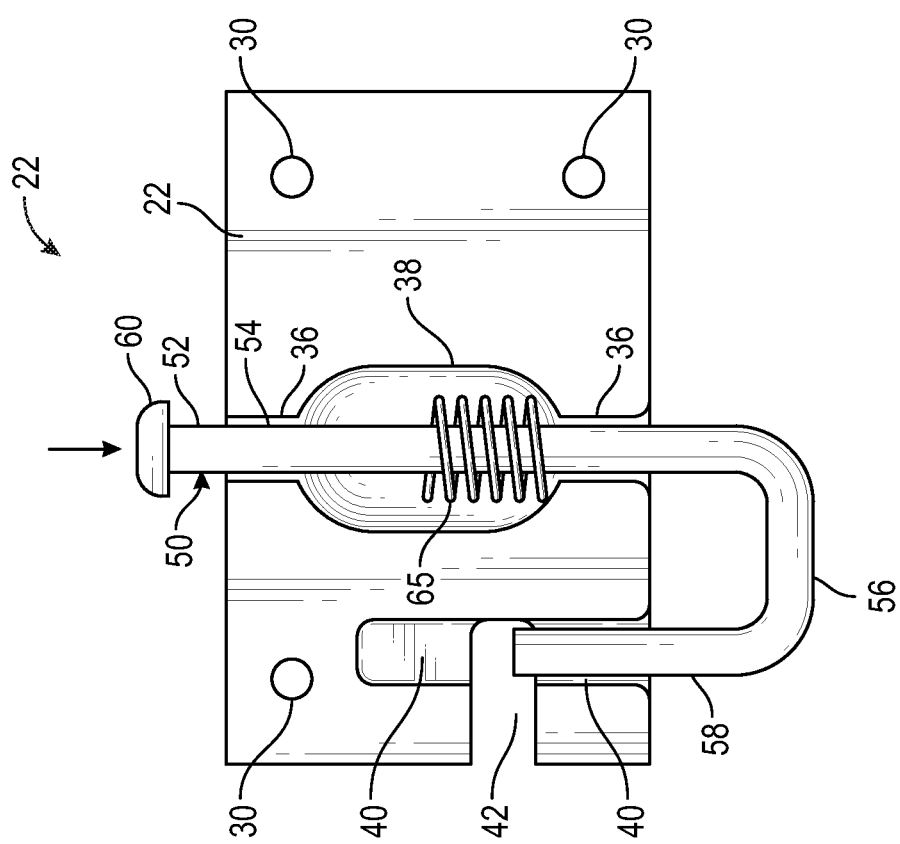
FIG. 6 illustrates an operational view of a trigger mechanism in first part.

Fishing tackle casting device 10 may include trigger mechanism 50 for launching fishing lure. Trigger mechanism 50 may include U-shaped rod 52 as shown in FIG. 5, in accordance with one embodiment of the present invention. U-shaped rod 52 may include first section 54, second section 56 and third section 58. As can be seen, first section 54 may be provided parallel to third section 58, and second section 56 may be provided perpendicular to first section 54 and third section 58. Further, it should be understood that first section 54 may indicate longer side of U-shaped rod 52, third section 58 may indicate shorter side of U-shaped rod 52, and second section 56 may indicate section connecting first section 54 and third section 58 perpendicularly. U-shaped rod 52 may further include head section 60 at the free end of first section 54. Further, U-shaped rod 52 may include spring 65. In the current embodiment, U-shaped rod 52 may be placed in first part 22 in that first section 54 of U-shaped rod 52 may be placed in first receiving section 36, third section 58 of U-shaped rod 52 may be placed in second receiving section 36, and spring 65 may be positioned within first spring receiving section 38 and second spring receiving section 44. Due to the shape of U-shaped rod 52 and inner side of first part 22, second section 56 of U-shaped rod 52 may be positioned outside of first part 22 as shown in FIGS. 4B and 5. Due to the shape of first receiving section 36, second receiving section 40 and U-shaped rod 52, in default or normal position, third section 58 of U-shaped rod 52 may be positioned in second receiving section 40 such that third section 58 may pass through and obstruct first groove 42, as shown in FIG. 5. Further, U-shaped rod 52 may be operated by pressing head section 60 to push down U-shaped rod 52. When U-shaped rod 52 is pushed down, third section 58 may go down freeing up first groove 42, as shown in FIG. 6. In other words, upon pressing U-shaped rod 52, third section 58 may go down thereby removing obstruction to first groove 42.

Figure 7:
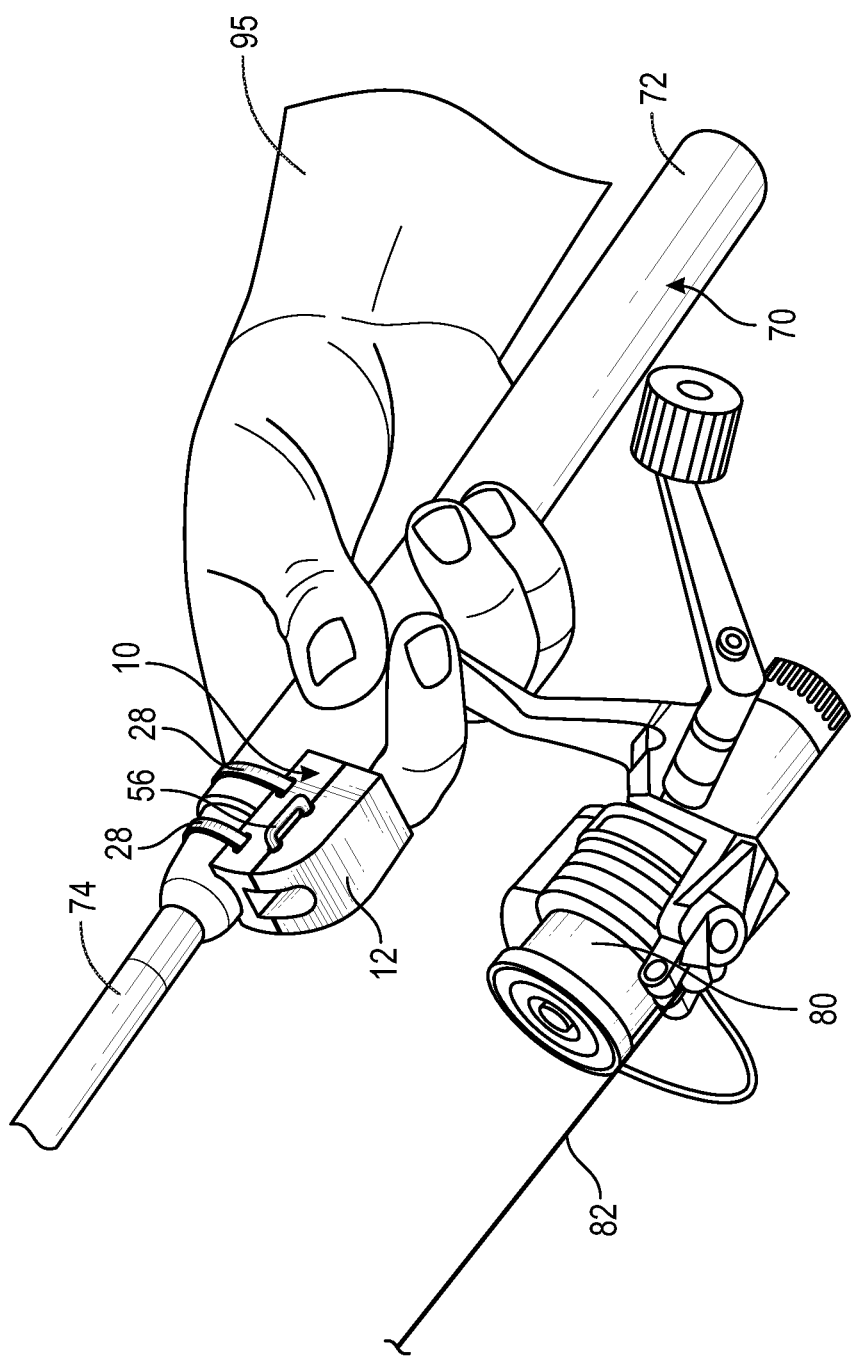
FIG. 7 illustrates the fishing tackle casting device mounted to the fishing rod.
Figure 8:
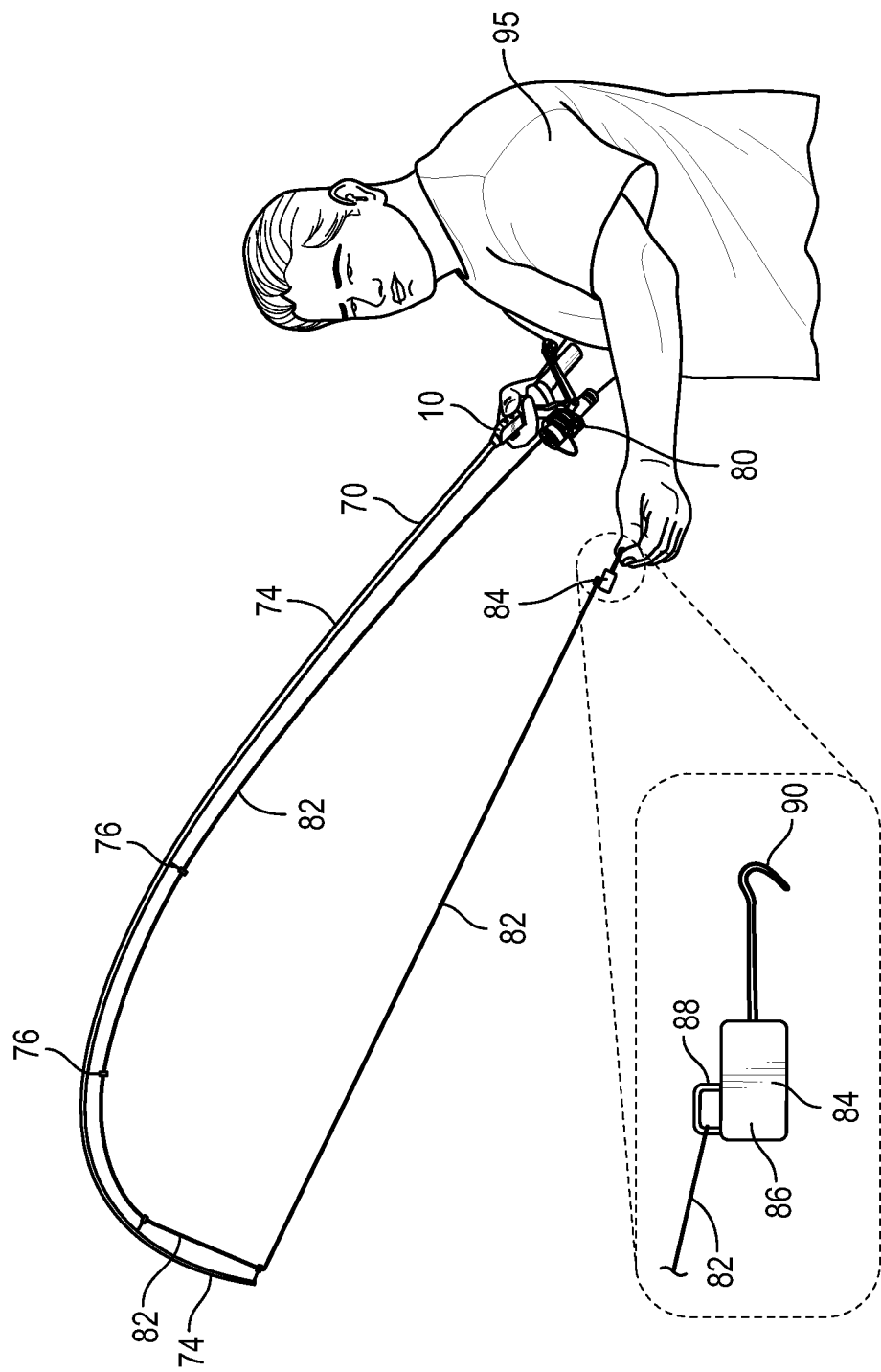
FIG. 8 illustrates fishing lure provided at the end of line of the fishing pole.

Now, FIG. 7 shows fishing tackle casting device 10 mounted to fishing rod 70, in accordance with one embodiment of the present invention. In order to mount fishing tackle casting device 10 to fishing rod 70, at first, rear end 16 of housing 12 may be made to face handle 72 of fishing rod 70. Specifically, pole receiving section 34 may be aligned with handle 72 and connectors 28 may be tightened around handle 72 to mount fishing tackle casting device 10 to fishing rod 70. Alternatively, handle 72 may be drawn through gap formed between housing 12 (i.e., pole receiving section 34 of second part 24) and connectors 28, and connectors 28 may be tightened at appropriate distance on handle 72. It should be understood that fishing tackle casting device 10 may mount in a way that head section 60 of U-shaped rod 52 comes at right side of handle 72 considering a right-handed fisherman. Similarly, fishing tackle casting device 10 may be mounted to have head section 60 of U-shaped rod 52 on the left side of handle 72 so that left-handed fisherman may be able to operate fishing tackle casting device 10 easily. It should be understood that fishing tackle casting device 10 may be mounted to the right or left side of handle 72 to prevent fishing lure 84 from interfering with line 82 when fishing lure 84 is cast. In other words, fishing tackle casting device 10 may be moved perpendicular to and to the right or left side of handle 72 such that fishing lure 84 does not interfere with line 82 when fishing lure 84 is cast.

Figure 2:
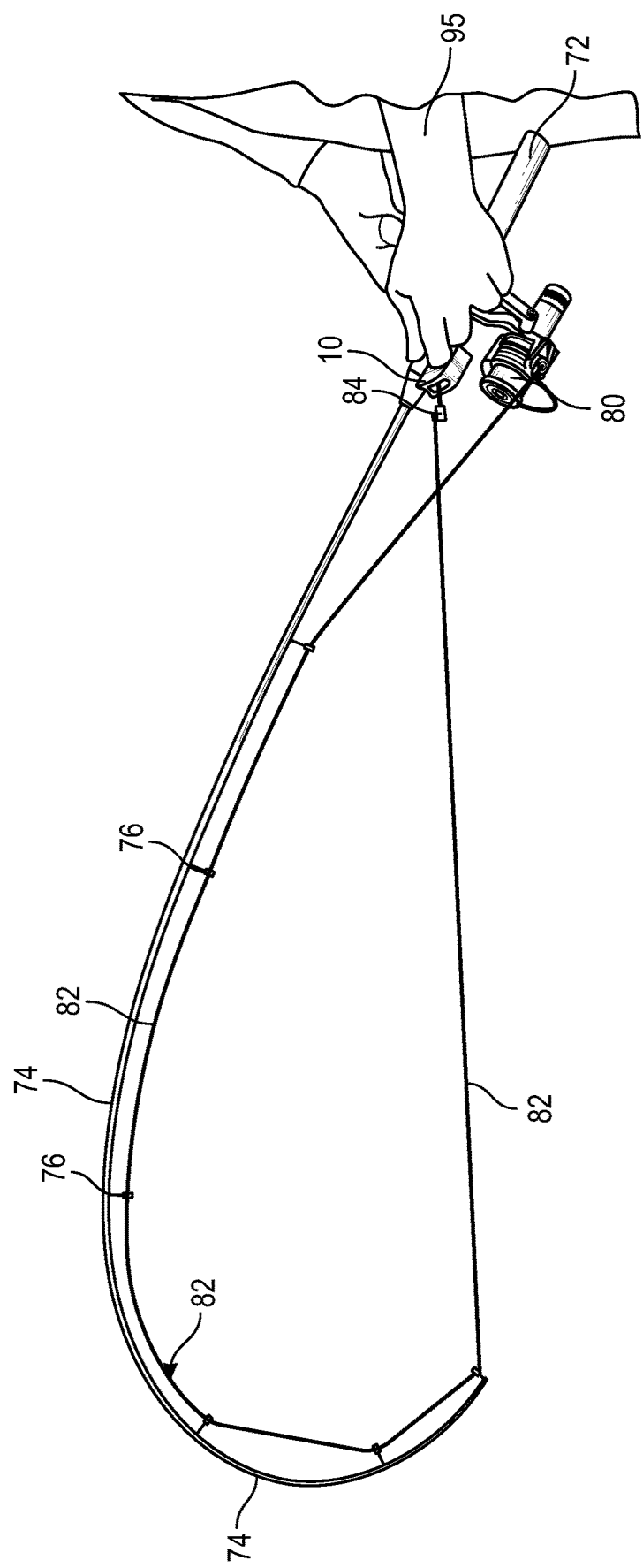
FIGS. 2 and 3 illustrate a feature of fishing lure secured to the fishing tackle casting device.
Figure 3:
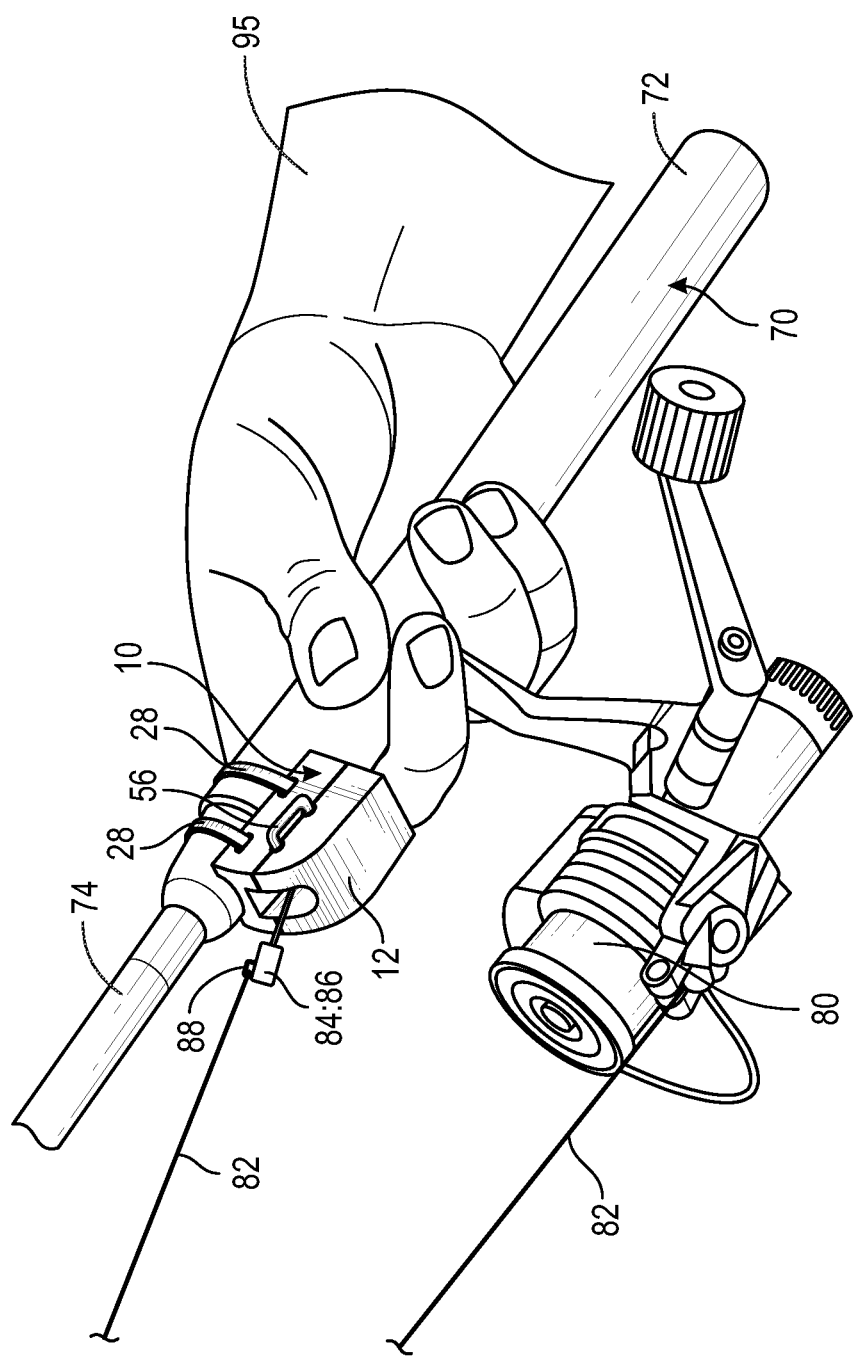
Figure 9:
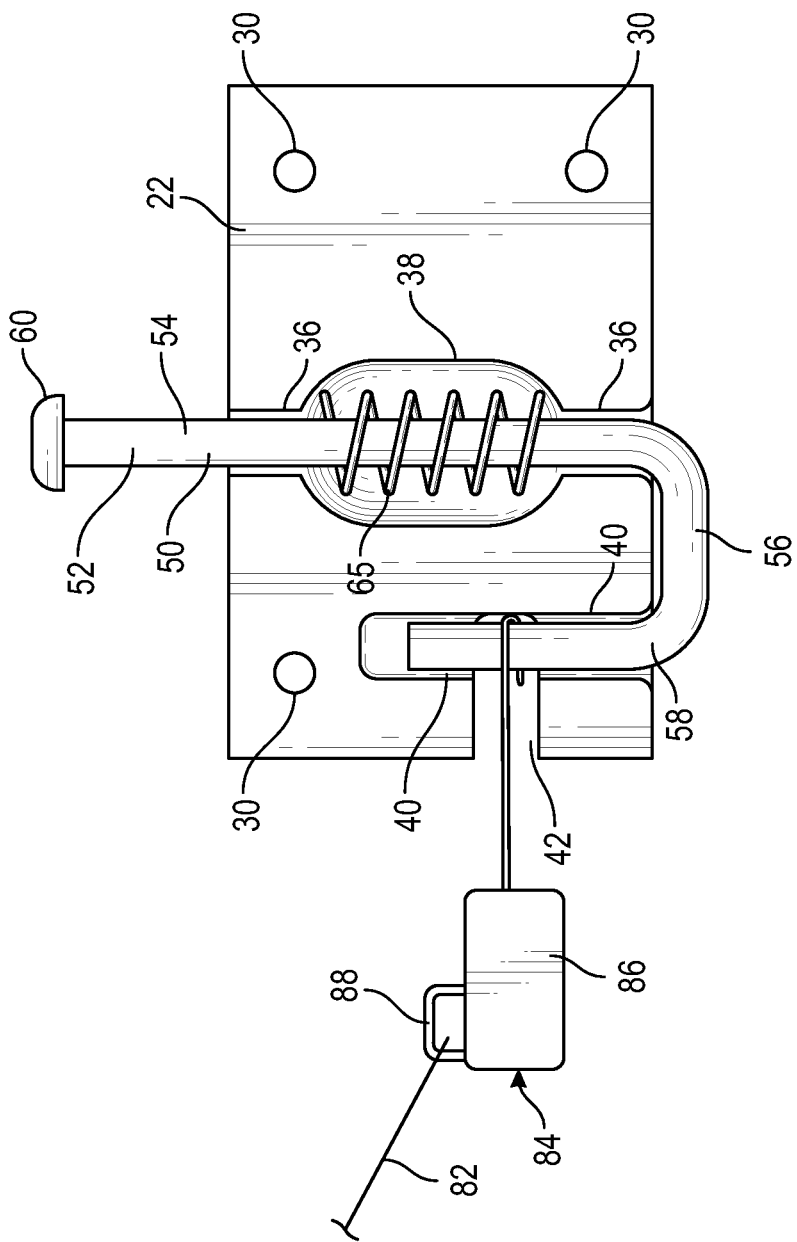
FIG. 9 illustrates fishing lure secured to U-shaped rod of the trigger mechanism.

After mounting fishing tackle casting device 10 to handle 72, fisherman 95 may connect fishing lure 84 to fishing tackle casting device 10. In order to connect fishing lure 84, fisherman 95 may hold fishing lure 84 with one hand and press head section 60 of U-shaped rod 52 for pushing down third section 58 (as shown in FIG. 6) so that hook 90 of fishing lure 84 may be placed in second receiving section 40 through first groove 42 and second groove 44. In other words, fisherman 95 may press on head section 60 such that third section 58 of U-shaped rod 52 may further go into second receiving section 40 to receive hook 90 into second receiving section 40. Subsequently, fisherman 95 may release pressure on head section 60 such that third section 58 of U-shaped rod 52 may hold or lock hook 90 in first groove 42 and second groove 44, as shown in FIGS. 2, 3 and 9. In one example, third section 58 may be slightly bent towards or angled inwards first section 54 such that third section 58 will be able to hold hook 90 firmly in place or keep hook 90 from sliding/slipping off accidentally or from getting released early.

It should be understood that when a fisherman places fishing lure 84 in trigger mechanism 50 of fishing tackle casting device 10, fishing pole 74 bends (as shown in FIGS. 2, 3 and 9) and stores energy. In other words, fishing lure 84 provided at the end of line 82 may be placed over third section 58 for locking line 82 and fishing lure 84 in place thereby locking the tension on fishing pole 74 and the line 82 in place on the reel 80.

Figure 10:
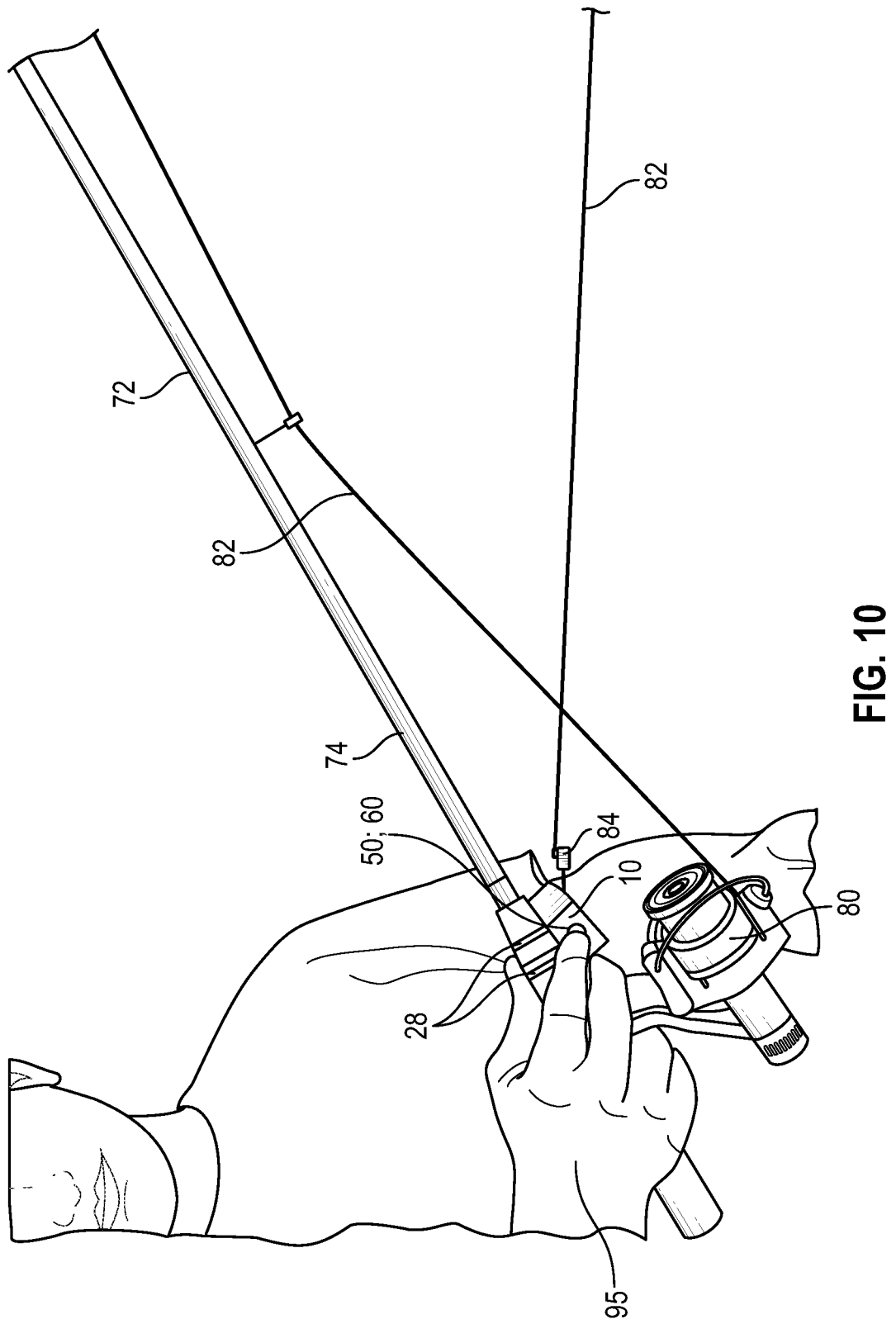
FIG. 10 illustrates a feature of fisherman actuating or pressing the trigger mechanism.
Figure 11:
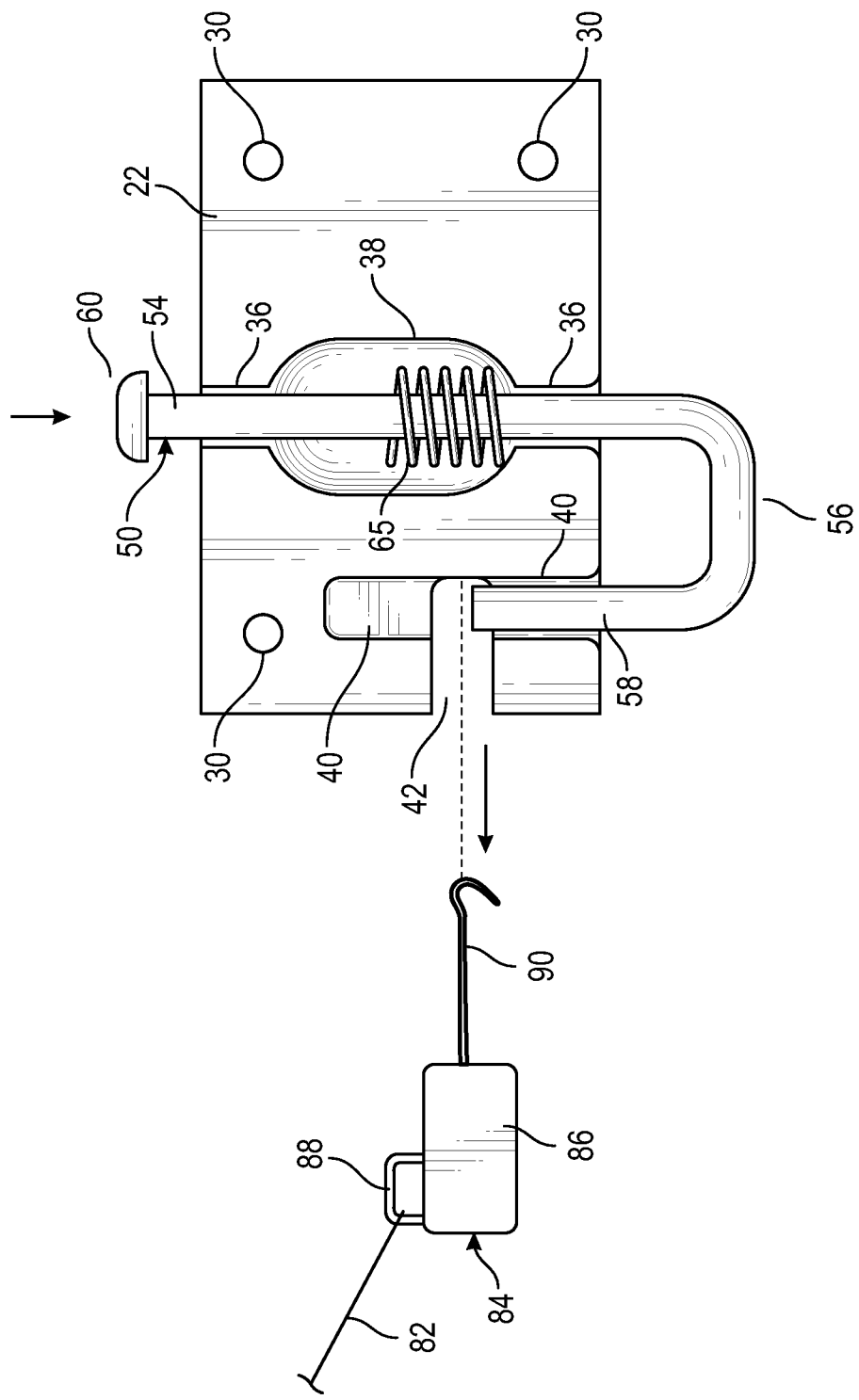
FIG. 11 illustrates a feature in which fishing lure is released from the fishing tackle casting device upon actuating or pressing the trigger mechanism.
Figure 12:
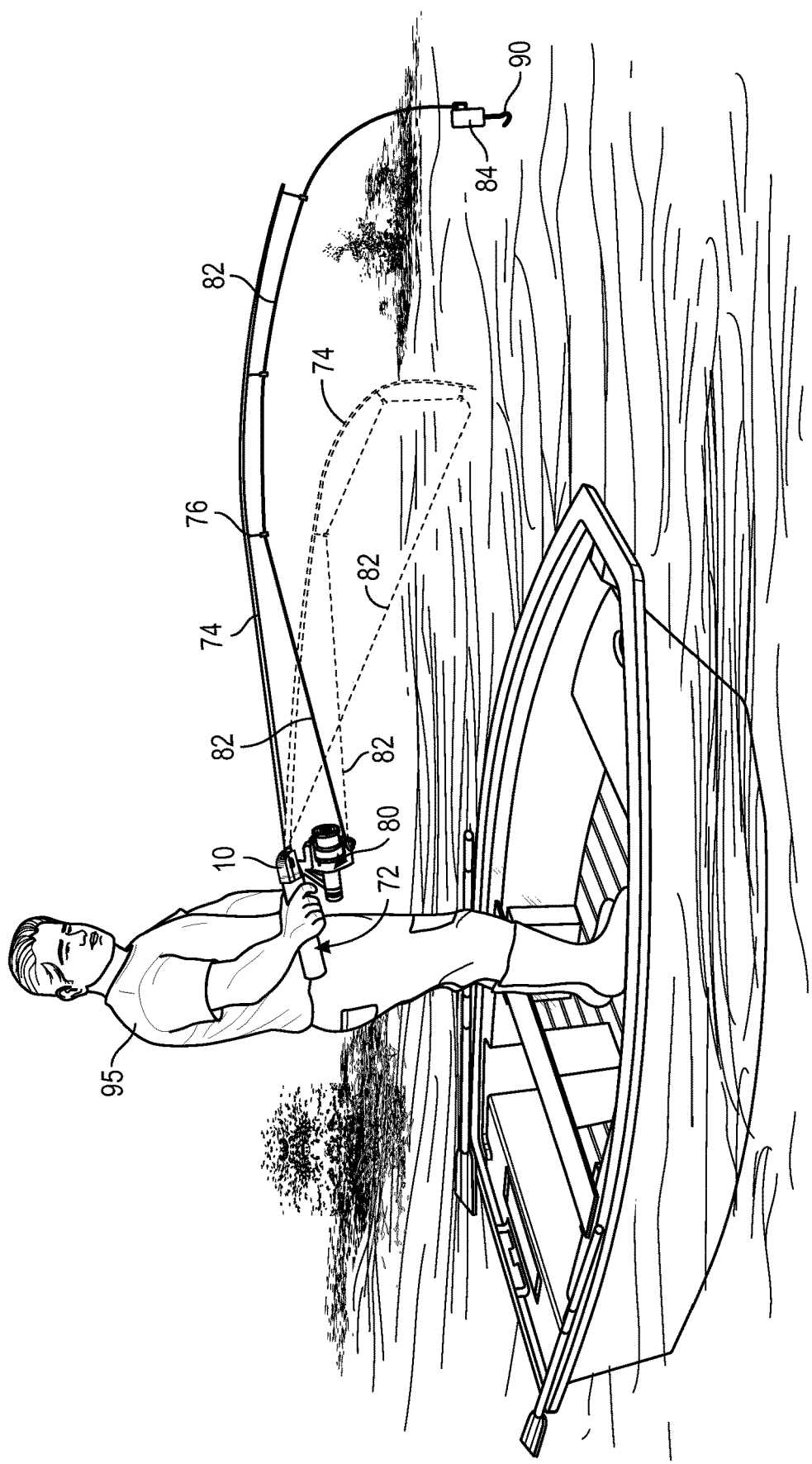
FIG. 12 illustrates a feature of fisherman casting fishing lure with the help of fishing tackle casting device.

In order to cast fishing lure 84, at first, fisherman 95 may point fishing rod 70 i.e., fishing pole 74 toward the intended place of landing. Subsequently, fisherman 95 may press head section 60 of U-shaped rod 52 (as shown in FIG. 10) such that third section 58 of U-shaped rod 52 may go below first groove 42 and release hook 90 from fishing tackle casting device 10, as shown in FIG. 11. In other words, when fisherman 95 actuates trigger mechanism 50 (as shown in FIG. 10), third section 58 of U-shaped rod 52 holding hook 90 may be released such that line 82 and fishing lure 84 made to travel to the targeted area, as shown in FIG. 12.

It should be understood that when fisherman 95 actuates trigger mechanism 50 by pressing head section 60 of U-shaped rod 52, tension in line 82 may be released at greater force and line 82 and fishing lure 84 may be made to travel to the targeted area in the intended direction accurately. Here, it should be understood that fishing tackle casting device 10 may lock fishing lure 84 and use the power stored in the bent fishing pole 74 to cast the fishing lure 84 when fishing lure 84 releases in response to actuating the trigger mechanism 50. Upon releasing bent fishing pole 74, the tension on the fishing pole 74 may be released. This release carries away the fishing lure 84 and line 82 to a desired area, similar to the act of a "rod throw" with accompanying arm motion to the side or overhead to cast the fishing lure 84.

As the fisherman 95 may be able to hold fishing rod 70 and activate/actuate trigger mechanism 50 with single hand, fisherman without experience in casting fishing lure may operate fishing rod 70 with the help of fishing tackle casting device 10. Further, fisherman with physical disabilities may also cast fishing lure 90 with the help of fishing tackle casting device 10 by adjusting the placement of fishing tackle casting device 10 on fishing rod 70 as may be desired.

Figure 13A:
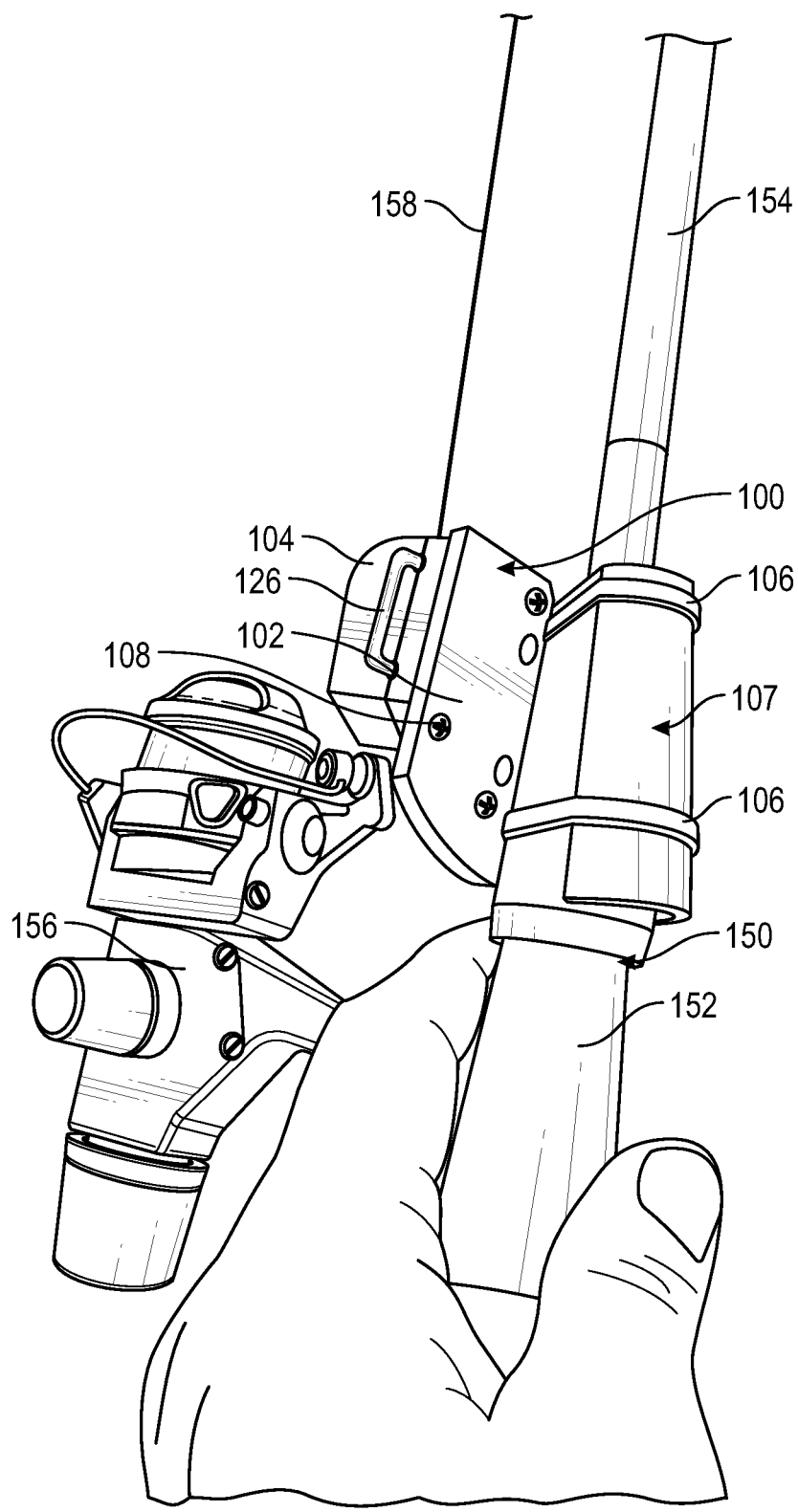
FIGS. 13A, 13B and 14 illustrate fishing tackle casting device mounted to the fishing rod, in accordance with another embodiment of present invention.
Figure 13B:
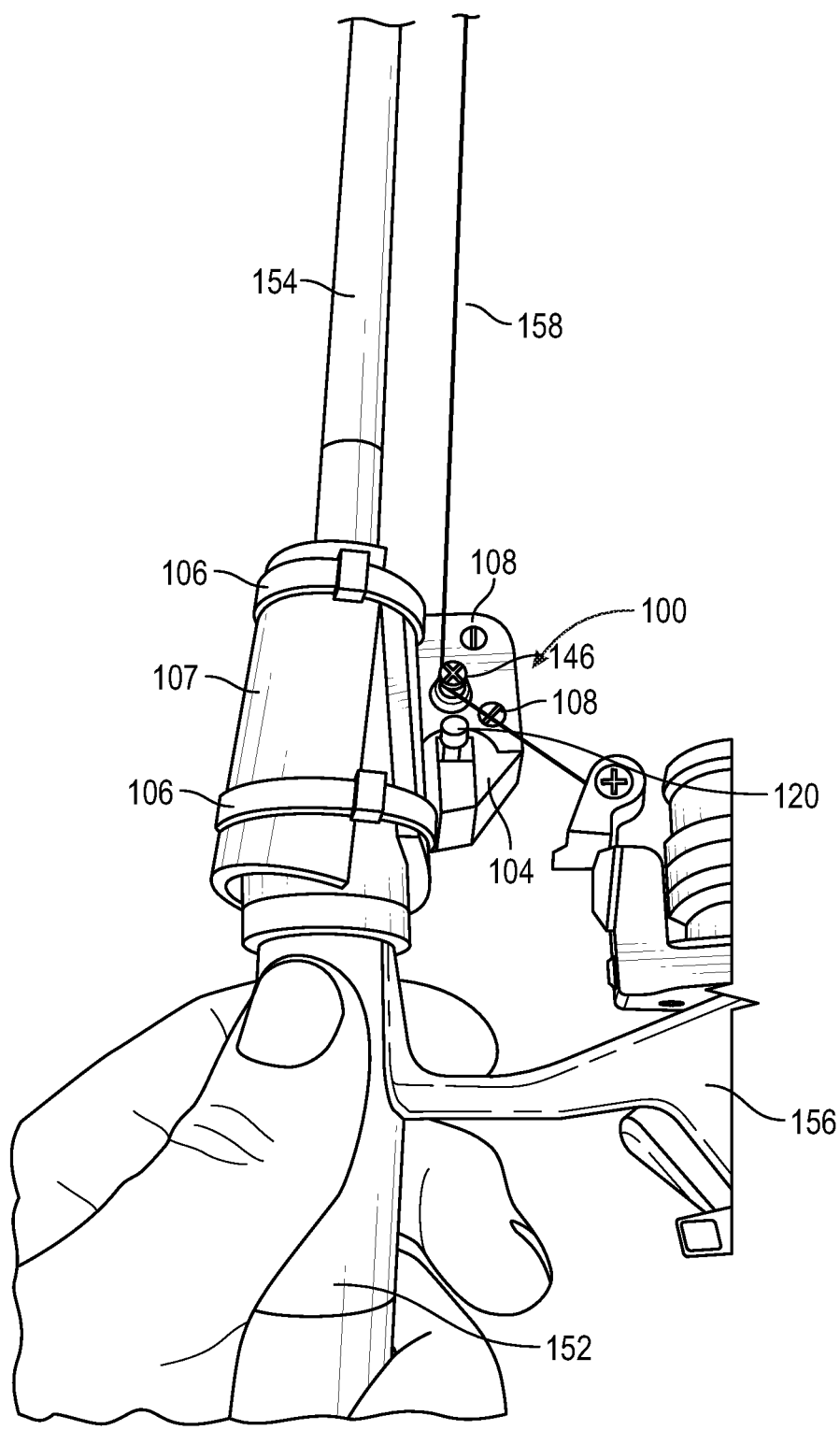
Figure 14:
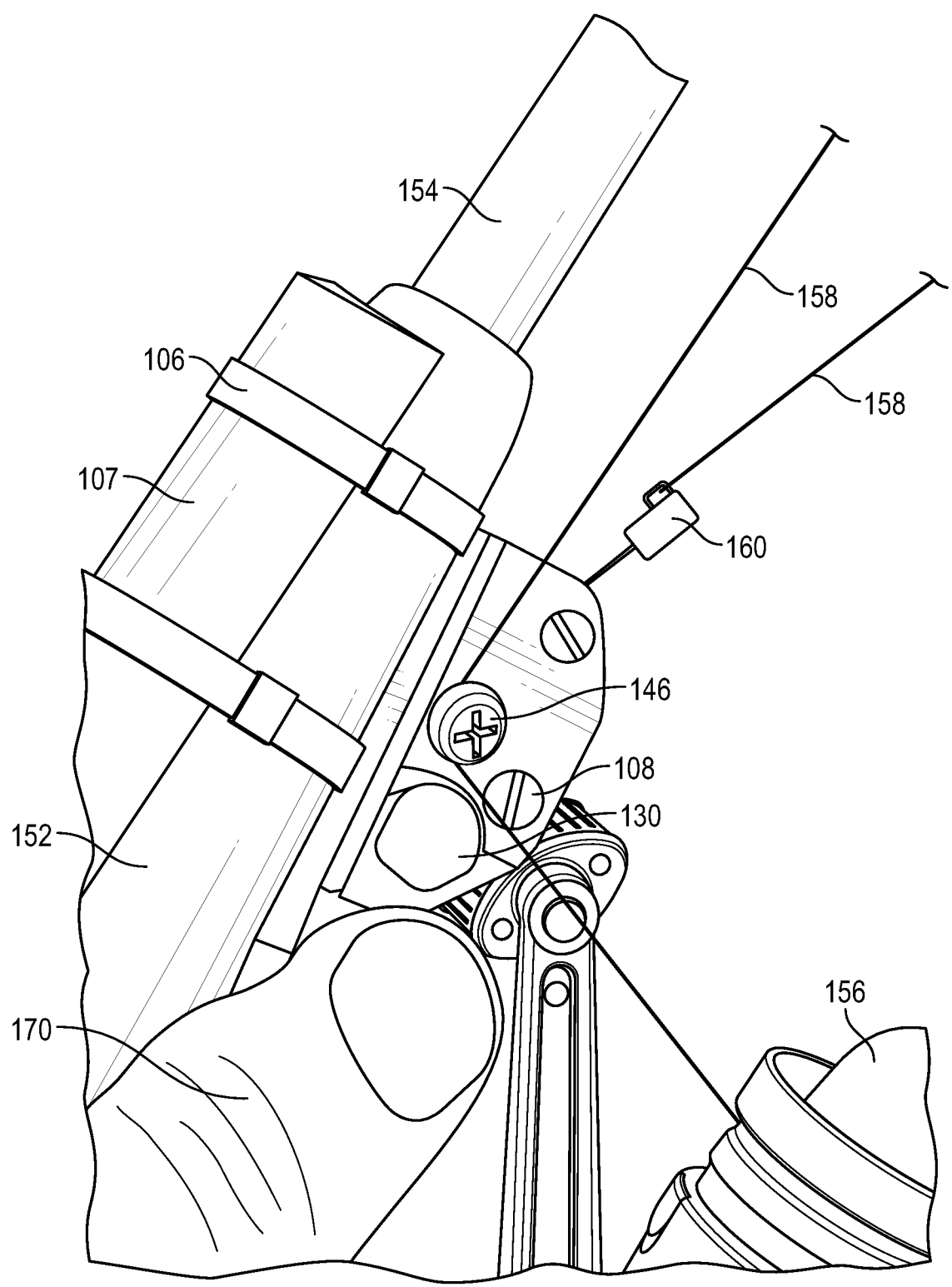

Now, FIGS. 13A, 13B and 14 show side perspective views of fishing tackle casting device 100 mounted to fishing rod 150, in accordance with another embodiment of the present invention. In the current embodiment, tackle pole casting device 100 may include first part 102 and second part 104. First part 102 may include connectors 106 (similar to connectors 28 in FIG. 4A) for mounting fishing tackle casting device 100 to fishing rod 150. Fishing tackle casting device 100 may further include support device 107 made up of plastic or any other soft material to provide support/grip for fishing tackle casting device 100 when mounted to fishing rod 150. Further, first part 102 and second part 104 may include corner holes 109 for connecting them using fasteners 108.

Now, FIG. 14 shows inner side of second part 104, in accordance with one embodiment of the present invention. Here, second part 104 may include first receiving section 110 (similar to first receiving section 36 in FIG. 5), spring receiving section 112 (similar to first spring receiving section 38), and second receiving section 114 (similar to second receiving section 40) and first groove 116 (similar to first groove 42). Further, second part 104 may include third receiving section 116 adjacent and parallel to first receiving section 110. Further, second part 104 includes cavity 118 adjacent to spring receiving section 112. In addition, second part 104 may include second groove 119 formed at side of second part 104.

Fishing tackle casting device 100 may include trigger mechanism 120 (similar to trigger mechanism 50 in FIG. 5). Trigger mechanism 120 may include U-shaped rod 122. U-shaped rod 122 may include first section 124, second section 126 and third section 128. As can be seen, first section 124 may be parallel to third section 128, and second section 126 may be perpendicular to first section 124 and third section 128. Further, it should be understood that first section 124 indicates a longer side of U-shaped rod 122, third section 128 indicates a shorter side of U-shaped rod 122, and second section 126 indicates a section connecting first section 124 and third section 128 perpendicularly. U-shaped rod 122 further incudes head section 130 at the free end of first section 124. U-shaped rod 122 may include spring 132. In the current embodiment, U-shaped rod 122 may be placed in second part 104 in that first section 124 of U-shaped rod 122 may be placed in first receiving section 110, third section 128 of U-shaped rod 122 may be placed in second receiving section 114, and spring 132 may be positioned within spring receiving section 112.

Figure 15:
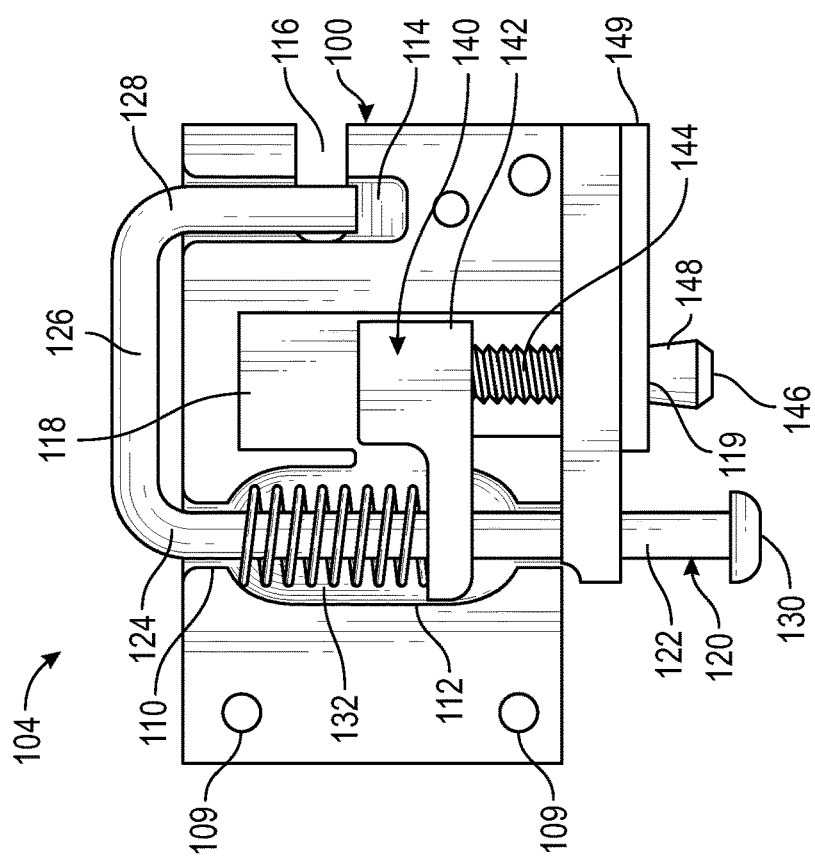

In the current embodiment, trigger mechanism 120 may include trigger support mechanism 140. Trigger support mechanism 140 may include extended member 142 made up of plastic, metal or any other material. As can be seen in at least FIG. 15, extended member 142 may be received in cavity 118. Extended member 142 may be mounted to first section 124 of U-shaped rod 122 using known mechanism such as fasteners. Further, trigger support mechanism 140 may include rod 144 drawn through second groove 119 and connected to extended member 142. Rod 144 may include head 146 and neck portion 148. Neck portion 148 may be tapered or curved in a suitable angle to control speed at which trigger mechanism 120 may be operated to control the speed of release of fishing lure or line from fishing tackle casting device 100. In one example, trigger support mechanism 140 may include plate 149 provided at neck portion 148, as shown in FIG. 15.

Figure 18:
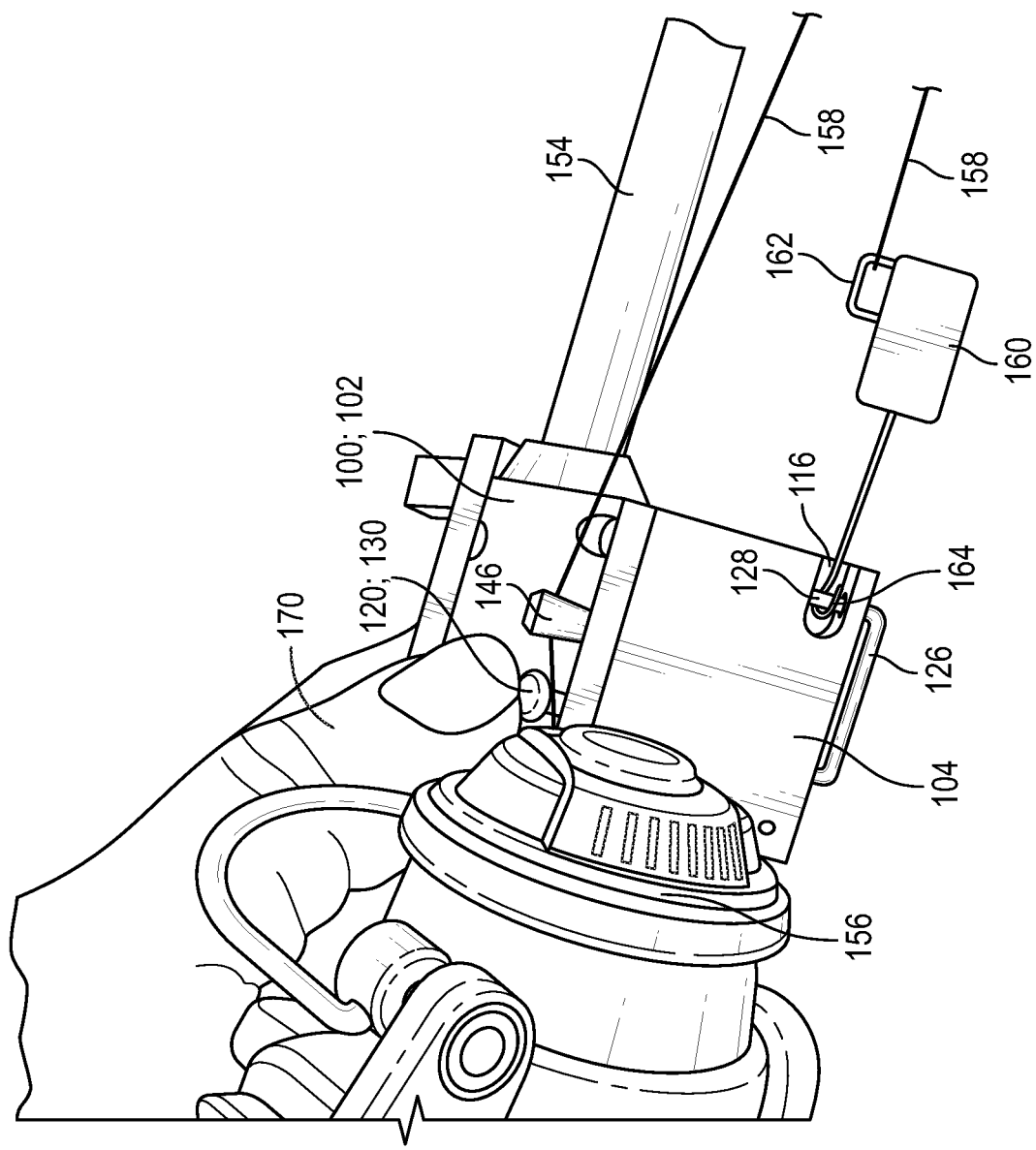
FIGS. 18 and 19 illustrate operational feature of trigger mechanism to secure and to release fishing lure from the fishing tackle casting device to make fishing lure travel to the targeted area.

As specified above, fishing tackle casting device 100 may be connected to fishing rod 150, as shown in FIGS. 13A, 13B and 14. Fishing rod 150 may include handle 152. Fishing rod 150 may include fishing pole 154 extending from handle 152. Fishing pole 154 may include eyes or rings (not shown, similar to eyes 76) provided at equal or varying distance from one another along the length of pole 154. Fishing rod 150 may further include line reel 156 mounted to handle 152 or fishing pole 154 as known in the art. Line reel 156 may include line 158. Line 158 may be drawn from line reel 156 and extended through eyes. In the current embodiment, line 158 may be provided with fishing lure 160 at the free end, as shown in FIG. 18. In accordance one exemplary embodiment, fishing lure 160 may include line connector 162 indicating a ring-like structure for receiving or connecting line 158 to fishing lure 160. Fishing lure 160 may further include hook 164 extending from fishing lure 160.

In the current embodiment, fishing tackle casting device 100 may be mounted to fishing rod 150, as shown in FIGS. 13A, 13B and 14. Fishing tackle casting device 100 may be mounted to fishing rod 150 at handle 152 or fishing pole 154 with the help of connectors 106. As specified above, handle 152 or fishing pole 154 may be drawn through a gap formed between first part 102 and connectors 106, and connectors 106 may be tightened at an appropriate distance on handle 152 or fishing pole 154. It should be understood that fishing tackle casting device 100 may be mounted in a way that head section 130 of U-shaped rod 122 comes at right side of handle 152, considering a right-handed fisherman. Similarly, fishing tackle casting device 100 may be mounted to have head section 130 of U-shaped rod 122 on the left side of handle 152 so that a left handed fisherman may operate fishing tackle casting device 100 easily. As specified above, fishing tackle casting device 100 may be mounted to the right or left side of handle 152 to prevent fishing lure 160 from interfering with line 158 when line 158 is cast. In other words, fishing tackle casting device 100 is moved perpendicular to and to the right or left side of handle 152 of fishing rod 150.

After mounting fishing tackle casting device 100 to handle 152 or fishing pole 154, fisherman 170 may connect fishing lure 160 to fishing tackle casting device 100, as shown in FIG. 18. In order to connect fishing lure 160, fisherman 170 may hold fishing lure 160 with one hand and press head section 130 of U-shaped rod 122 for pushing down third section 128 (as shown in FIG. 15) so that hook 164 of fishing lure 160 may be placed in second receiving section 114 through first groove 116. It should be understood that upon positioning fishing lure 160 in trigger mechanism 120 (third section 128) of fishing tackle casting device 100, fishing pole 154 bends and stores energy. In other words, line 158 from line reel 154 is placed over third section 128 for locking line 158 in place and locking the tension on fishing pole 154 and line 158 in place on the reel 156.

Subsequently, fisherman 170 may press or disengage or release pressure on head section 130 (FIGS. 15 and 18) such that third section 128 of U-shaped rod 122 may further go into second receiving section 114 and hold or lock hook 164 in first groove 116, as shown in FIG. 18.

Figure 16:
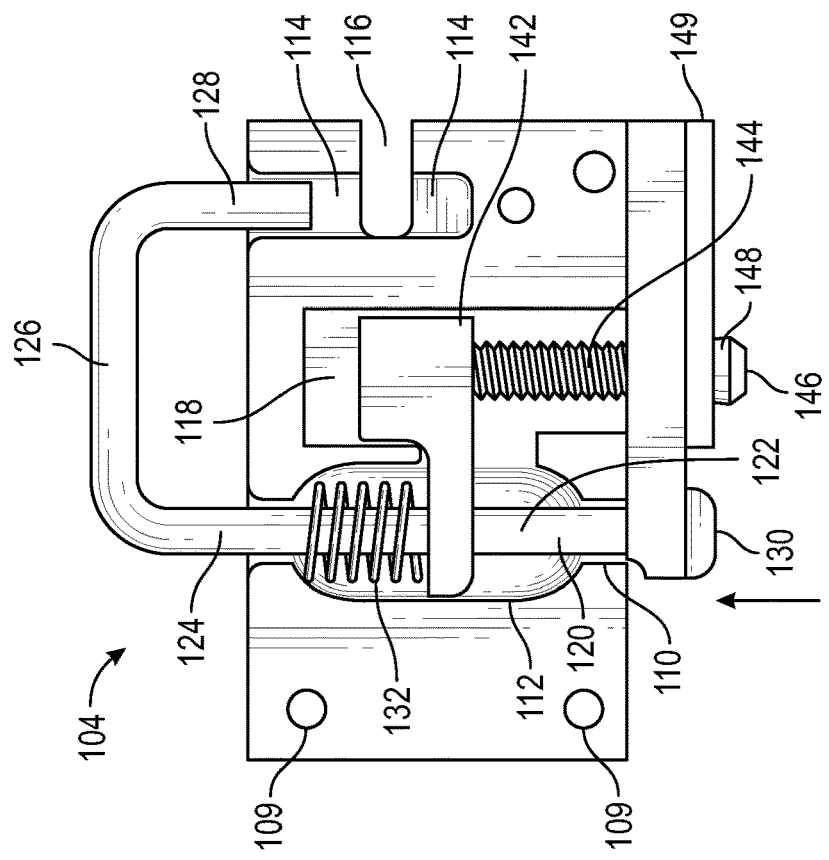
FIGS. 15 and 16 illustrate an operational feature of the trigger mechanism.
Figure 19:
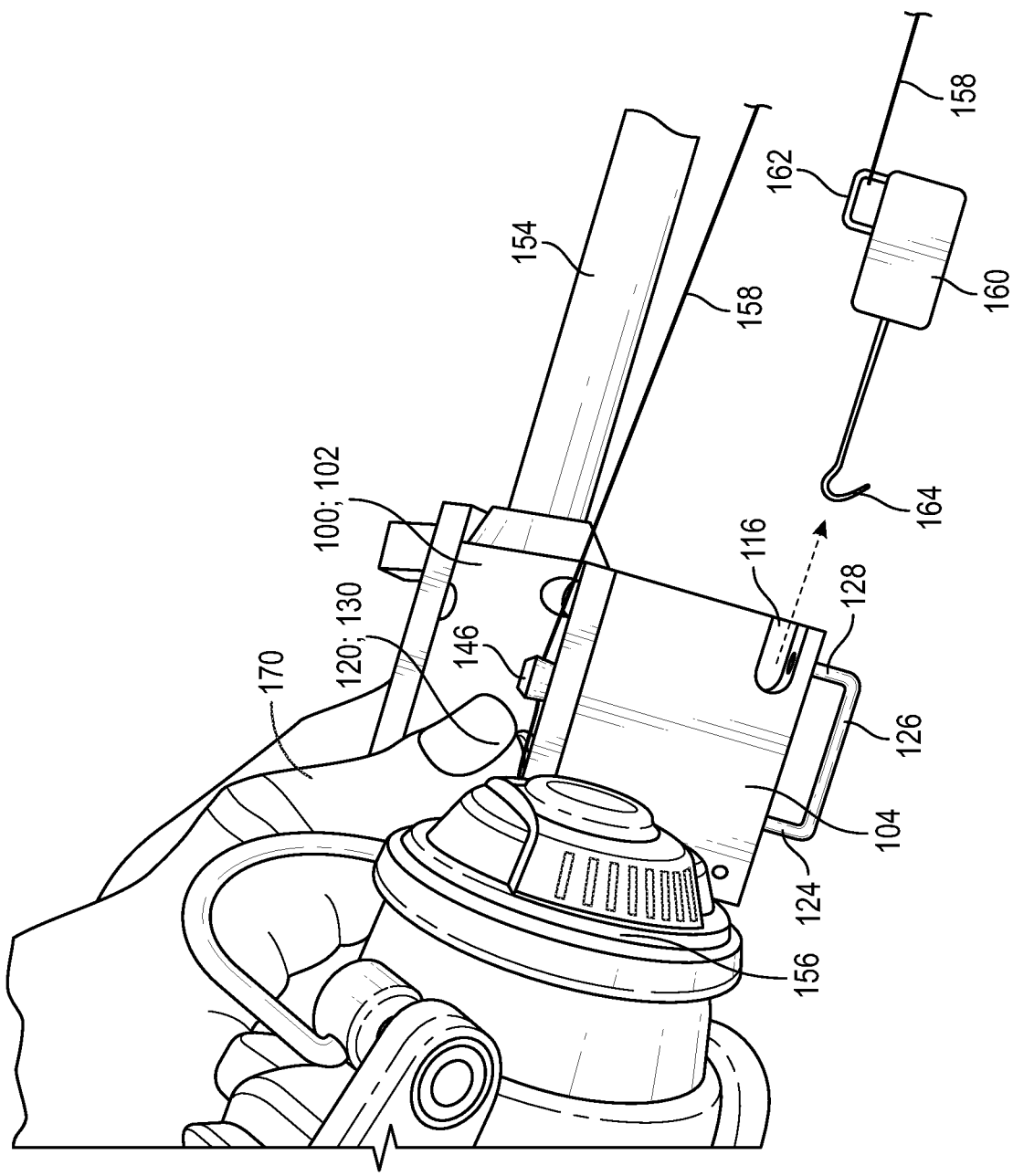

In order to cast fishing lure 160, at first, fisherman 170 may point fishing rod 150, i.e., fishing pole 154 toward the intended place of landing (similar to FIG. 12). Subsequently, fisherman 170 may press head section 130 of U-shaped rod 122 such that third section 128 of U-shaped rod 122 goes below first groove 116 and releases hook 164 from fishing tackle casting device 100, as shown in FIGS. 16 and 19. In other words, when fisherman 170 actuates trigger mechanism 120, third section 128 of U-shaped rod 122 holding hook 164 may be released such that fishing lure 160 may be made to travel to the targeted area (similar to FIG. 12).

In accordance with current embodiment, fisherman 170 may place or lock fishing line 158 from line reel 156 at sloped/tapered area of neck portion 148 of trigger support mechanism 140, as shown in FIGS. 13B and 14. Line 158 may be locked at neck portion 148 to lock the tension on fishing pole 154 and line 158 in place on line reel 156. In the current embodiment, when fisherman 170 presses head section 130 of trigger mechanism 120, third section 128 may be pushed down thereby releasing hook 164 of fishing lure 160 and line 158 to make them travel to the targeted area. Concurrently, trigger support mechanism 140 may be also pushed down along with trigger mechanism 120 inwards. Line 158 at neck portion 148 may be pushed against the side of the second part 104. As a result, line 158 may be configured to rise up or push up over the slanted edge of neck portion 148. This makes line 158 from the line reel 156 to move straight and take fishing lure 160 along with line 158 to the targeted or intended area.

Figure 17D:
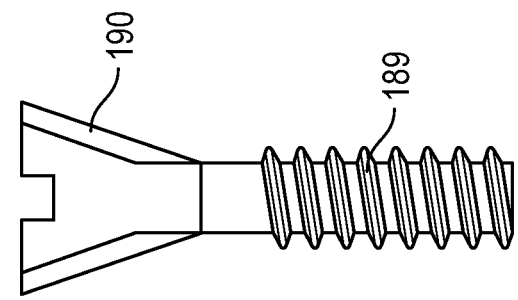
FIGS. 17A through 17D illustrate various shapes of the trigger mechanism, in accordance with one embodiment of present invention.
Figure 17C:
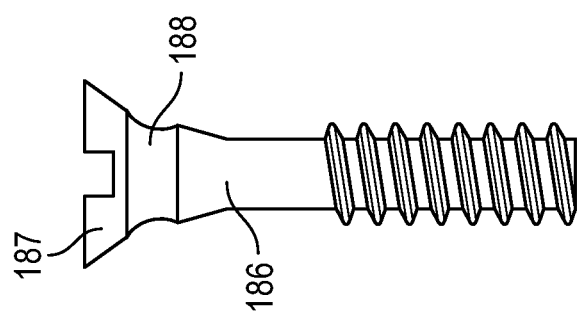

It should be understood that the position of line 158 at neck portion 148 may adjusted inward or outward to synchronize the release of lure 160 or hook 164 to maximize the distance of the cast. In one embodiment, the trigger mechanism 140 may be provided in variety of shapes to synchronize the release of lure 160 or hook 164 to maximize the distance of the cast. Referring to FIGS. 17A through 17D, various shapes of trigger mechanism are disclosed. Referring to FIG. 17A, trigger mechanism 180 including neck portion 181 provided at an approximately 45 to 60 degrees from trigger mechanism 180, in accordance with one exemplary embodiment of the present invention. Further, trigger mechanism 180 may include cut-section 182.

Figure 17B:
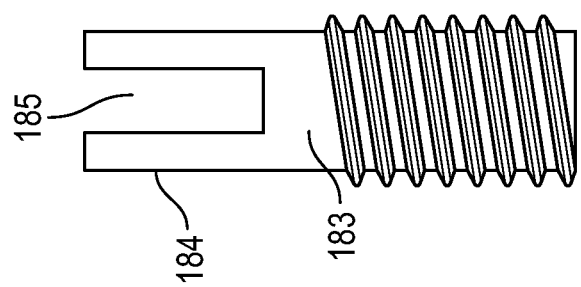
Figure 17A:
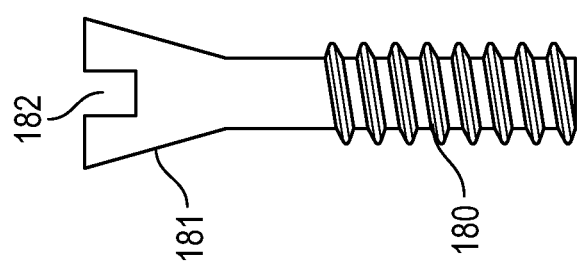

Referring to FIG. 17B, trigger mechanism 183 including flat neck portion 184 is shown, in accordance with one exemplary embodiment of the present invention. Further, trigger mechanism 183 may include cut-section 185. Referring to FIG. 17C, trigger mechanism 186 including neck portion 187 provided at an approximately 45 to 60 degrees from trigger mechanism 180 is shown, in accordance with one exemplary embodiment of the present invention. In the current example, neck portion 187 may include cut-section 188. Referring to FIG. 17D, trigger mechanism 189 including neck portion 190 provided at an approximately 45 to 60 degrees from trigger mechanism 180 is shown, in accordance with one exemplary embodiment of the present invention. In each of trigger mechanisms shown in FIGS. 17A through 17D, line 158 may be mounted at neck portion to adjust the position of line 158 inwardly or outwardly to synchronize the release of lure 160 or hook 164 to maximize the distance of the cast.

As specified above, fishing lure 160 may be securely locked at third section 128 of trigger mechanism 120 and line 158 may be securely locked in place at neck portion 148 of trigger support mechanism 140 until the fisherman 170 pushes head section 130 of trigger mechanism 120. Once fisherman 170 presses head section 130 of trigger mechanism 120 (FIG. 19), fishing lure 160 may be released from third section 128 of trigger mechanism 120 and made to travel to the desired area without swinging fishing rod 150 rod to the side or overhead. This ensures fisherman 170 uses only one hand to "dock shoot" and does not require the fisherman to lower to the level of the dock to cast fishing lure 160. Due to construction of fishing tackle casting device 100, fishing lure 160 may propel on a straight line forward to the desired area which makes it extremely accurate, making it possible for the fishing lure 160 to enter small or seclude area otherwise not available to fisherman 170. Further, since fisherman 170 activates trigger mechanism 120 with his finger, fisherman 170 does not move his arms, shoulders, or upper body. Thus, fisherman with injuries or disabilities will be able to operate fishing tackle casting device 100 for casting fishing lure 160 accurately at the desired area.

Based on the above, it is evident that the present fishing tackle casting device may be removably connected to fishing rod. Fishing tackle casting device 150 includes trigger mechanism that may lock the fishing lure, and trigger support mechanism that may securely mount the line in place. When needed, the fisherman may direct the fishing rod 150 in the desired area and actuate or press trigger mechanism to release the line and fishing lure straight to the desired area without swinging fishing rod 150 to the side or overhead. In other words, bottom portion of the line serves as an accurate aiming point to the target similar to using the aiming site on a rifle.

The disclosed fishing tackle casting device may be operated with only one hand, so the fisherman does not have to bend or lower to the level of the dock to cast the fishing lure unlike in the known art. The fishing lure may be secured to the fishing tackle casting device 100 which is mounted at the handle or fishing rod 150. As a result, when the trigger mechanism is actuated, fishing tackle casting device 100 propels the fishing lure on a straight line forward to the desired area which makes it extremely accurate, makes it possible for the fishing lure to enter small or seclude area otherwise not available to fishermen. As the fisherman may operate fishing tackle casting device 100 with his fingers without having to move his arms or shoulders or upper body, this ensures that even fisherman with injuries or disabilities will be able to operate the fishing tackle casting device. Further, fisherman without skill or practice may also operate the fishing tackle casting device to fish in small or restrictive areas.

The fishing tackle casting device may be mounted to new or existing fishing rods without interfering with traditional casting methods. As such, the presently disclosed fishing tackle casting device may be used by variety of fisherman, including but not limited to, boat fisherman, bank fisherman, fisherman who wade streams, and those who have injuries or disabilities that limit effective, traditional casting. As specified above, the fishing tackle casting device may be removably mounted to a fishing rod, if fisherman wishes to use the fishing rod as a traditional casting rod, then he/she may simply remove the fishing tackle casting device from the fishing rod and use the fishing rod for casting fishing lure.

The present invention also uses the traditional power of the "Rod Throw" without the accompanying arm motion to the side or overhead to cast fishing lure into a small area. It requires less skill or practice than currently accepted methods and patented methods, and it removes the need of a fisherman to be an expert caster to successfully fish in small or restrictive areas. The present invention may also be adapted for "Dock Shooting" as it allows fishermen or fisherman to cast fishing lure or line straight forward into a small area with accuracy and efficiency. Further, the presently disclosed fishing tackle casting device may be attached to almost any existing fishing rod/pole or manufactured as part of a new fishing rod.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. A fishing tackle casting device for casting a fishing lure, said fishing tackle casting device comprising:
a housing comprising a first part and a second part, wherein an inner side of said first part comprises a first receiving section, a second receiving section, and a first groove, wherein an inner side of said second part comprises a second groove, and wherein said first groove and said second groove aligns when said first part connects to said second part; and
a trigger mechanism comprising a U-shaped rod, wherein said U-shaped rod comprises a first section, a second section and a third section, wherein said first section is longer than and parallel to said third section, wherein said first section is placed in said first receiving section, and said third section is placed in said second receiving section, wherein said second section is connected between and perpendicularly to said first section and said third section, wherein said third section intersects perpendicularly with said first groove and said second groove, wherein said first section rests in said first receiving section and said third section rests in said second receiving section, wherein said first part and said second part connect and said housing receives a fishing rod along a pole receiving section on an outer side of the second part, wherein said fishing rod comprises:
a fishing pole; and
a line reel mounted to said fishing rod, wherein said line reel comprises a line having said fishing lure at one end,
wherein said fishing lure locks to said third section through said first groove and said second groove causing said fishing pole to bend and store energy, and
wherein said fishing pole is configured for directing to a targeted area and said trigger mechanism is configured for actuation to release said fishing lure from said third section through said first groove and said second groove, thereby releasing the tension at the fishing pole for sending said fishing lure and line to the targeted area.

2. The fishing tackle casting device of claim 1, wherein said third section angles towards said first section for preventing said fishing lure from slipping off accidentally or from getting released early.

3. The fishing tackle casting device of claim 2, wherein said first receiving section comprises a first spring receiving section.

4. The fishing tackle casting device of claim 3, wherein said second part comprises a second spring receiving section, wherein said second spring receiving section aligns with said first spring receiving section.

5. The fishing tackle casting device of claim 4, further comprises a spring mounted to said first section and received at said first spring receiving section and said second spring receiving section, wherein said spring facilitates operation of said trigger mechanism for locking and releasing said fishing lure to said U-shaped rod.

6. The fishing tackle casting device of claim 1, wherein said second part further comprises a plurality of connectors for mounting said fishing tackle casting device to said fishing rod.

7. A fishing rod for casting a fishing lure, said fishing rod comprising:
a fishing pole;
a line reel mounted to said fishing pole;
a line drawn from said line reel and along said fishing pole, wherein said line comprises said fishing lure; and
said fishing rod further comprising a fishing tackle casting device, said fishing tackle casting device comprising:
a first part and a second part, wherein said first part mounts to said fishing pole, wherein an inner side of said second part comprises a first receiving section, a second receiving section, and a first groove, wherein an inner side of said second part comprises a second groove;
a trigger mechanism comprising a U-shaped rod, wherein said U-shaped rod comprises a first section, a second section and a third section, wherein said first section is longer and parallel to said third section, wherein said first section is placed in said first receiving section, and said third section is placed in said second receiving section, wherein said second section is connected between and perpendicularly to said first section and said third section, wherein said third section intersects perpendicularly with said first groove; and
a trigger support mechanism comprising an extended member mounted to said first section of said U-shaped rod, wherein said extended member comprises a rod having a neck portion,
wherein said fishing lure secures to said third section through said first groove, causing said fishing pole to bend and store energy, and said line secures to said neck portion of said trigger support mechanism for holding tension on said fishing lure and locking said fishing lure in a fixed position,
said fishing pole is configured for directing at a targeted area and said trigger mechanism configured for actuation to release said fishing lure from said third section through said first groove such that tension caused by bending of said fishing pole releases, thereby causing said fishing lure and said line to travel to the targeted area, and wherein said neck portion ensures that the tension on said line releases and synchronizes the release of said fishing lure upon casting said fishing lure.

8. The fishing rod of claim 7, wherein said third section angles towards said first section for preventing said fishing lure from slipping off accidentally or from getting released early.

9. The fishing rod of claim 8, wherein said first receiving section comprises a spring receiving section.

10. The fishing rod of claim 9, further comprising a spring is mounted to said second section, wherein said spring is configured to sit within said spring receiving section.

11. The fishing rod of claim 7, wherein said first part further comprises a plurality of connectors for mounting said fishing tackle casting device to said fishing rod.

12. The fishing rod of claim 7, wherein said rod draws through said second groove, and wherein said rod comprises a head portion adjacent to said neck portion.

13. The fishing rod of claim 12, wherein said neck portion comprises a tapered or rounded segment having an angle to control the speed and synchronize the release of said fishing lure from said fishing tackle casting device.

14. A method of casting a fishing lure, the method comprising steps of:

providing a housing having a first part and a second part, an inner side of said first part having a first receiving section, a second receiving section, and a first groove, an inner side of said second part comprising a second groove, and said first groove and said second groove aligning when said first part connects to said second part;

providing a trigger mechanism comprising a U-shaped rod, said U-shaped rod comprising a first section, a second section and a third section, said first section being longer and parallel to said third section, said first section being placed in said first receiving section, and said third section being placed in said second receiving section, said second section being connected between and perpendicularly to said first section and said third section, said third section intersecting perpendicularly with said first groove and said second groove;

mounting said housing to a side of a fishing rod, said fishing rod comprising a fishing pole, a line reel mounted to said fishing rod and said line reel comprising a line, said line comprising a fishing lure;

locking said fishing lure to said third section through said first groove and said second groove thereby causing said fishing pole to bend and store energy; and casting said fishing lure by directing said fishing pole at a targeted area and actuating said trigger mechanism to release said fishing lure from said third section through said first groove and said second groove, thereby causing tension release at the bent fishing pole for making said fishing lure and said line travel to the targeted area.

15. The method of claim 14, further comprising providing a spring within said first section for operating said trigger mechanism.

\* \* \* \* \*